(12) United States Patent
Kim

(10) Patent No.: US 9,504,209 B2
(45) Date of Patent: *Nov. 29, 2016

(54) IRRIGATION SPRINKLER NOZZLE

(75) Inventor: Eugene Ezekiel Kim, Buena Park, CA (US)

(73) Assignee: Rain Bird Corporation, Azusa, CA (US)

( * ) Notice: Subject to any disclaimer, the term of this patent is extended or adjusted under 35 U.S.C. 154(b) by 813 days.

This patent is subject to a terminal disclaimer.

(21) Appl. No.: 13/069,334

(22) Filed: Mar. 22, 2011

(65) Prior Publication Data

US 2011/0248097 A1  Oct. 13, 2011

Related U.S. Application Data

(63) Continuation-in-part of application No. 12/859,159, filed on Aug. 18, 2010, and a continuation-in-part of application No. 12/757,912, filed on Apr. 9, 2010.

(51) Int. Cl.
| | | |
|---|---|---|
| *A01G 25/00* | (2006.01) | |
| *B05B 1/08* | (2006.01) | |
| *B05B 1/26* | (2006.01) | |
| *B05B 3/02* | (2006.01) | |

(52) U.S. Cl.
CPC ............... *A01G 25/00* (2013.01); *B05B 1/267* (2013.01); *B05B 3/021* (2013.01)

(58) Field of Classification Search
CPC ......... B05B 1/08; B05B 1/34; B05B 1/3086; B05B 1/18; B05B 15/067; B05B 1/14; B05B 1/3026; B05B 1/267; F15C 1/22; A01G 25/023; A01G 25/092; A01G 25/00

USPC .............. 239/11, 457, 460, 498, 513, 539, 239/DIG. 1, 522, 483
See application file for complete search history.

(56) References Cited

U.S. PATENT DOCUMENTS

| | | | |
|---|---|---|---|
| 458,607 A | | 9/1891 | Weiss |
| 1,523,609 A | | 1/1922 | Roach |
| 1,432,386 A | | 10/1922 | Curney |
| 2,125,863 A | | 4/1933 | Munz |
| 2,075,589 A | * | 3/1937 | Munz .............................. 239/11 |
| 2,125,978 A | | 8/1938 | Arbogast |
| 2,128,552 A | | 8/1938 | Arbogast |
| 2,325,280 A | | 8/1938 | Rader |
| 2,130,810 A | | 9/1938 | Munz |

(Continued)

FOREIGN PATENT DOCUMENTS

| | | |
|---|---|---|
| AU | 783999 | 1/2006 |
| CA | 2427450 | 6/2004 |

(Continued)

OTHER PUBLICATIONS

Advisory Action mailed Jul. 14, 2011 for U.S. Appl. No. 11/947,571 (3 pgs.).

(Continued)

*Primary Examiner* — Arthur O Hall
*Assistant Examiner* — Chee-Chong Lee
(74) *Attorney, Agent, or Firm* — Fitch, Even, Tabin & Flannery, LLP

(57) ABSTRACT

A spray nozzle for an irrigation sprinkler is provided, where the nozzle includes a constriction having a reduced cross sectional flow area achieved using a plurality of channels.

22 Claims, 21 Drawing Sheets

(56) References Cited

U.S. PATENT DOCUMENTS

| | | | |
|---|---|---|---|
| 2,875,783 A | 4/1941 | Bentley | |
| 2,348,776 A * | 5/1944 | Bentley | 239/460 |
| 2,634,163 A | 4/1953 | Double | |
| 2,723,879 A | 11/1955 | Martin | |
| 2,785,013 A | 3/1957 | Steams | |
| 2,935,266 A | 6/1958 | Coleondro | |
| 3,029,030 A | 1/1959 | Wiant | |
| 2,914,257 A * | 11/1959 | Wiant | 239/460 |
| 2,990,123 A | 6/1961 | Hyde | |
| 2,990,128 A | 6/1961 | Hyde | |
| 3,109,591 A * | 11/1963 | Moen | 239/460 |
| 3,239,149 A | 3/1966 | Lindberg, Jr. | |
| 3,380,659 A | 4/1968 | Seablom | |
| 3,752,403 A | 8/1973 | Diest | |
| 3,940,066 A | 2/1976 | Hunter | |
| 3,948,285 A | 4/1976 | Flynn | |
| 3,955,764 A | 5/1976 | Phaup | |
| 4,026,471 A | 5/1977 | Hunter | |
| 4,119,275 A | 10/1978 | Hunter | |
| 4,131,234 A | 12/1978 | Pescetto | |
| 4,189,099 A | 2/1980 | Bruninga | |
| 4,198,000 A | 4/1980 | Hunter | |
| 4,253,608 A | 3/1981 | Hunter | |
| 4,272,024 A | 6/1981 | Kah, Jr. | |
| 4,316,579 A | 2/1982 | Ray | |
| 4,353,506 A | 10/1982 | Hayes | |
| 4,353,507 A | 10/1982 | Kah, Jr. | |
| 4,398,666 A | 8/1983 | Hunter | |
| 4,417,691 A | 11/1983 | Lockwood | |
| 4,456,181 A | 6/1984 | Burnham | |
| 4,471,908 A | 9/1984 | Hunter | |
| 4,479,611 A | 10/1984 | Galvis | |
| 4,501,391 A | 2/1985 | Hunter | |
| 4,566,632 A | 1/1986 | Sesser | |
| 4,568,024 A | 2/1986 | Hunter | |
| 4,579,284 A | 4/1986 | Arnold | |
| 4,579,285 A | 4/1986 | Hunter | |
| 4,609,146 A | 9/1986 | Walto | |
| 4,618,100 A | 10/1986 | White et al. | |
| 4,624,412 A | 11/1986 | Hunter | |
| 4,625,917 A | 12/1986 | Torney | |
| RE32,386 E | 3/1987 | Hunter | |
| 4,660,766 A | 4/1987 | Nelson | |
| 4,669,663 A | 6/1987 | Meyer | |
| 4,676,438 A | 6/1987 | Sesser | |
| 4,681,260 A | 7/1987 | Cochran | |
| 4,681,263 A | 7/1987 | Cockman | |
| 4,682,732 A | 7/1987 | Walto | |
| 4,699,321 A | 10/1987 | Bivens | |
| 4,708,291 A | 11/1987 | Grundy | |
| 4,718,605 A | 1/1988 | Hunter | |
| 4,720,045 A | 1/1988 | Meyer | |
| 4,739,934 A | 4/1988 | Gewelber | |
| D296,464 S | 6/1988 | Marmol | |
| 4,752,031 A | 6/1988 | Merrick | |
| 4,763,838 A | 8/1988 | Holcomb | |
| 4,784,325 A | 11/1988 | Walker et al. | |
| 4,796,809 A | 1/1989 | Hunter | |
| 4,796,811 A | 1/1989 | Davisson | |
| 4,815,662 A | 3/1989 | Hunter | |
| 4,834,289 A | 5/1989 | Hunter | |
| 4,836,449 A | 6/1989 | Hunter | |
| 4,836,450 A | 6/1989 | Hunter | |
| 4,840,312 A | 6/1989 | Tyler | |
| 4,842,201 A | 6/1989 | Hunter | |
| 4,867,378 A | 9/1989 | Kah, Jr. | |
| 4,898,332 A | 2/1990 | Hunter | |
| 4,901,924 A | 2/1990 | Kah | |
| 4,932,590 A | 6/1990 | Hunter | |
| 4,944,456 A | 7/1990 | Zakai | |
| 4,948,052 A | 8/1990 | Hunter | |
| 4,955,542 A | 9/1990 | Kah | |
| 4,961,534 A | 10/1990 | Tyler | |
| 4,967,961 A | 11/1990 | Hunter | |
| 4,971,250 A | 11/1990 | Hunter | |
| D312,865 S | 12/1990 | Davisson | |
| 4,986,474 A | 1/1991 | Schisler | |
| 5,031,840 A | 7/1991 | Grundy | |
| 5,050,800 A | 9/1991 | Lamar | |
| 5,052,621 A | 10/1991 | Katzer | |
| 5,058,806 A | 10/1991 | Rupar | |
| 5,078,321 A | 1/1992 | Davis et al. | |
| 5,083,709 A | 1/1992 | Iwanowski | |
| RE33,823 E | 2/1992 | Nelson | |
| 5,086,977 A | 2/1992 | Kah, Jr. | |
| 5,090,619 A | 2/1992 | Barthold et al. | |
| 5,098,021 A | 3/1992 | Kah, Jr. | |
| 5,104,045 A | 4/1992 | Kah | |
| 5,123,597 A | 6/1992 | Bendall | |
| 5,141,024 A | 8/1992 | Hicks | |
| 5,148,990 A | 9/1992 | Kah, Jr. | |
| 5,148,991 A | 9/1992 | Kah | |
| 5,152,458 A | 10/1992 | Curtis | |
| 5,158,232 A | 10/1992 | Tyler | |
| 5,174,327 A | 12/1992 | Truax | |
| 5,174,501 A | 12/1992 | Hadar | |
| 5,199,646 A | 4/1993 | Kah | |
| 5,205,491 A | 4/1993 | Hadar | |
| 5,224,653 A | 7/1993 | Nelson | |
| 5,226,599 A | 7/1993 | Lindermeir | |
| 5,226,602 A | 7/1993 | Cochran | |
| 5,234,169 A | 8/1993 | McKenzie | |
| 5,240,182 A | 8/1993 | Lemme | |
| 5,240,184 A | 8/1993 | Lawson | |
| 5,267,689 A | 12/1993 | Forer | |
| 5,288,022 A | 2/1994 | Sesser | |
| 5,299,742 A | 4/1994 | Han | |
| 5,322,223 A | 6/1994 | Hadar | |
| 5,335,857 A | 8/1994 | Hagon | |
| 5,360,167 A | 11/1994 | Grundy | |
| 5,370,311 A | 12/1994 | Chen | |
| 5,372,307 A | 12/1994 | Sesser | |
| 5,375,768 A | 12/1994 | Clark | |
| 5,398,872 A | 3/1995 | Joubran | |
| 5,417,370 A | 5/1995 | Kah, Jr. | |
| 5,423,486 A | 6/1995 | Hunter | |
| 5,435,490 A | 7/1995 | Machut | |
| 5,439,174 A | 8/1995 | Sweet | |
| RE35,037 E | 9/1995 | Kah | |
| 5,456,411 A | 10/1995 | Scott | |
| 5,503,139 A | 4/1996 | McMahon | |
| 5,526,982 A | 6/1996 | McKenzie | |
| 5,544,814 A | 8/1996 | Spenser | |
| 5,556,036 A * | 9/1996 | Chase | 239/460 |
| 5,588,594 A | 12/1996 | Kah, Jr. | |
| 5,588,595 A | 12/1996 | Sweet | |
| 5,598,977 A | 2/1997 | Lemme | |
| 5,611,488 A | 3/1997 | Frolich | |
| 5,620,141 A | 4/1997 | Chiang | |
| 5,640,983 A | 6/1997 | Sherman, Jr. | |
| 5,642,861 A | 7/1997 | Ogi | |
| 5,653,390 A | 8/1997 | Kah | |
| 5,662,545 A | 9/1997 | Zimmerman | |
| 5,671,885 A | 9/1997 | Davisson | |
| 5,671,886 A | 9/1997 | Sesser | |
| 5,676,315 A | 10/1997 | Han | |
| D388,502 S | 12/1997 | Kah | |
| 5,695,123 A | 12/1997 | Le | |
| 5,699,962 A | 12/1997 | Scott | |
| 5,711,486 A | 1/1998 | Clark | |
| 5,718,381 A * | 2/1998 | Katzer et al. | 239/222.11 |
| 5,720,435 A | 2/1998 | Hunter | |
| 5,722,593 A | 3/1998 | McKenzie | |
| 5,758,827 A | 6/1998 | Van Le | |
| 5,762,270 A | 6/1998 | Kearby | |
| 5,765,757 A | 6/1998 | Bendall | |
| 5,765,760 A | 6/1998 | Kuo | |
| 5,769,322 A | 6/1998 | Smith | |
| 5,785,248 A | 7/1998 | Staylor | |
| 5,820,029 A | 10/1998 | Marans | |
| 5,823,439 A | 10/1998 | Hunter | |
| 5,823,440 A | 10/1998 | Clark | |
| 5,826,797 A | 10/1998 | Kah, III | |
| 5,845,849 A | 12/1998 | Mitzlaff | |

(56) References Cited

U.S. PATENT DOCUMENTS

| | | |
|---|---|---|
| 5,875,969 A | 3/1999 | Grundy |
| 5,918,812 A | 7/1999 | Beutler |
| 5,927,607 A | 7/1999 | Scott |
| 5,971,297 A | 10/1999 | Sesser |
| 5,988,523 A | 11/1999 | Scott |
| 5,992,760 A | 11/1999 | Kearby |
| 6,007,001 A | 12/1999 | Hilton |
| 6,019,295 A | 2/2000 | McKenzie |
| 6,029,907 A | 2/2000 | McKenzie |
| 6,042,021 A | 3/2000 | Clark |
| 6,050,502 A | 4/2000 | Clark |
| 6,076,744 A | 6/2000 | O'Brien |
| 6,076,747 A | 6/2000 | Ming-Yuan |
| 6,085,995 A | 7/2000 | Kah, Jr. |
| 6,102,308 A | 8/2000 | Steingrass |
| 6,109,545 A | 8/2000 | Kah |
| 6,138,924 A | 10/2000 | Hunter |
| 6,145,758 A | 11/2000 | Ogi |
| 6,155,493 A | 12/2000 | Kearby et al. |
| 6,158,675 A | 12/2000 | Ogi |
| 6,182,909 B1 | 2/2001 | Kah, Jr. |
| 6,186,413 B1 | 2/2001 | Lawson |
| 6,223,999 B1 | 5/2001 | Lemelshtrich |
| 6,227,455 B1 | 5/2001 | Scott |
| 6,230,988 B1 | 5/2001 | Chao |
| 6,230,989 B1 | 5/2001 | Haverstraw |
| 6,237,862 B1 | 5/2001 | Kah |
| 6,241,158 B1 | 6/2001 | Clark |
| 6,244,521 B1 | 6/2001 | Sesser |
| 6,264,117 B1 | 7/2001 | Roman |
| 6,286,767 B1 | 9/2001 | Hui-Chen |
| 6,332,581 B1 | 12/2001 | Chin |
| 6,336,597 B1 | 1/2002 | Kah |
| 6,341,733 B1 | 1/2002 | Sweet |
| 6,345,541 B1 | 2/2002 | Hendey |
| 6,367,708 B1 | 4/2002 | Olson |
| D458,342 S | 6/2002 | Johnson |
| 6,443,372 B1 | 9/2002 | Hsu |
| 6,454,186 B2 | 9/2002 | Haverstraw |
| 6,457,656 B1 | 10/2002 | Scott |
| 6,464,151 B1 | 10/2002 | Cordua |
| 6,478,237 B2 | 11/2002 | Kearby et al. |
| 6,488,218 B1 | 12/2002 | Townsend |
| 6,491,235 B1 | 12/2002 | Scott |
| 6,494,384 B1 | 12/2002 | Meyer |
| 6,499,672 B1 | 12/2002 | Sesser |
| 6,530,531 B2 | 3/2003 | Butler |
| 6,601,781 B2 | 8/2003 | Kah |
| 6,607,147 B2 | 8/2003 | Schneider |
| 6,622,940 B2 | 9/2003 | Huang |
| 6,637,672 B2 | 10/2003 | Cordua |
| 6,651,904 B2 | 11/2003 | Roman |
| 6,651,905 B2 | 11/2003 | Sesser |
| 6,688,539 B2 | 2/2004 | Vander Griend |
| 6,695,223 B2 | 2/2004 | Beutler |
| 6,715,699 B1 | 4/2004 | Greenberg |
| 6,719,218 B2 | 4/2004 | Cool et al. |
| 6,732,952 B2 | 5/2004 | Kah, Jr. |
| 6,736,332 B2 | 5/2004 | Sesser |
| 6,736,336 B2 | 5/2004 | Wong |
| 6,737,332 B1 | 5/2004 | Fuselier |
| 6,769,633 B1 | 8/2004 | Huang |
| 6,814,304 B2 | 11/2004 | Onofrio |
| 6,814,305 B2 | 11/2004 | Townsend |
| 6,817,543 B2 | 11/2004 | Clark |
| 6,820,825 B1 | 11/2004 | Wang |
| 6,827,291 B2 | 12/2004 | Townsend |
| 6,834,816 B2 | 12/2004 | Kah, Jr. |
| 6,840,460 B2 | 1/2005 | Clark |
| 6,848,632 B2 | 2/2005 | Clark |
| 6,854,664 B2 | 2/2005 | Smith |
| 6,869,026 B2 | 3/2005 | McKenzie |
| 6,871,795 B2 | 3/2005 | Anuskiewicz |
| 6,880,768 B2 | 4/2005 | Lau |
| 6,883,727 B2 | 4/2005 | De Los Santos |
| 6,921,030 B2 | 7/2005 | Renquist |
| 6,942,164 B2 | 9/2005 | Walker |
| 6,945,471 B2 | 9/2005 | McKenzie |
| 6,957,782 B2 | 10/2005 | Clark |
| 6,997,393 B1 | 2/2006 | Angold |
| 7,017,831 B2 | 3/2006 | Santiago |
| 7,017,837 B2 | 3/2006 | Taketomi |
| 7,028,920 B2 | 4/2006 | Hekman |
| 7,028,927 B2 | 4/2006 | Mermet |
| 7,032,836 B2 * | 4/2006 | Sesser et al. ................. 239/204 |
| 7,032,844 B2 | 4/2006 | Cordua |
| 7,040,553 B2 | 5/2006 | Clark |
| 7,044,403 B2 | 5/2006 | Kah, III |
| 7,070,122 B2 | 7/2006 | Burcham |
| 7,090,146 B1 | 8/2006 | Ericksen |
| 7,100,842 B2 | 9/2006 | Meyer |
| 7,104,472 B2 | 9/2006 | Renquist |
| 7,111,795 B2 | 9/2006 | Thong |
| 7,143,957 B2 | 12/2006 | Nelson |
| 7,143,962 B2 | 12/2006 | Kah, Jr. |
| 7,152,814 B1 | 12/2006 | Schapper |
| 7,156,322 B1 | 1/2007 | Heitzman |
| 7,159,795 B2 | 1/2007 | Sesser |
| 7,168,634 B2 | 1/2007 | Onofrio |
| 7,232,081 B2 | 6/2007 | Kah, Jr. |
| 7,234,651 B2 | 6/2007 | Mousavi |
| 7,240,860 B2 | 7/2007 | Griend |
| 7,287,711 B2 | 10/2007 | Crooks |
| 7,293,721 B2 | 11/2007 | Roberts |
| 7,303,147 B1 | 12/2007 | Danner |
| 7,303,153 B2 | 12/2007 | Han |
| 7,322,533 B2 | 1/2008 | Grizzle |
| 7,337,988 B2 | 3/2008 | McCormick et al. |
| 7,389,942 B2 | 6/2008 | Kenyon |
| RE40,440 E | 7/2008 | Sesser |
| 7,392,956 B2 | 7/2008 | McKenzie |
| 7,429,005 B2 | 9/2008 | Schapper |
| 7,478,526 B2 | 1/2009 | McAfee et al. |
| 7,533,833 B2 | 5/2009 | Wang |
| 7,581,687 B2 | 9/2009 | Feith |
| 7,584,906 B2 | 9/2009 | Lev |
| 7,597,273 B2 | 10/2009 | McAfee et al. |
| 7,607,588 B2 | 10/2009 | Nobili |
| 7,611,077 B2 | 11/2009 | Sesser |
| 7,621,467 B1 | 11/2009 | Garcia |
| 7,654,474 B2 | 2/2010 | Cordua |
| 7,686,235 B2 | 3/2010 | Roberts |
| 7,686,236 B2 | 3/2010 | Alexander |
| 7,703,706 B2 | 4/2010 | Walker |
| D615,152 S | 5/2010 | Kah, Jr. |
| 7,766,259 B2 | 8/2010 | Feith |
| D628,272 S | 11/2010 | Kah |
| 7,828,229 B2 | 11/2010 | Kah, Jr. |
| 7,850,094 B2 | 12/2010 | Richmond |
| 7,861,948 B1 | 1/2011 | Crooks |
| D636,459 S | 4/2011 | Kah |
| 7,926,746 B2 | 4/2011 | Melton |
| 7,971,804 B2 | 7/2011 | Roberts |
| RE42,596 E | 8/2011 | Sesser |
| 8,006,919 B2 | 8/2011 | Renquist |
| 8,047,456 B2 | 11/2011 | Kah |
| 8,056,829 B2 | 11/2011 | Gregory |
| 8,074,877 B2 | 12/2011 | Mullen |
| 8,074,897 B2 | 12/2011 | Hunnicutt |
| 8,205,811 B2 | 6/2012 | Cordua |
| 8,272,583 B2 | 9/2012 | Hunnicutt |
| 8,651,400 B2 | 2/2014 | Walker |
| 8,672,242 B2 | 3/2014 | Hunnicutt |
| 8,695,900 B2 | 4/2014 | Hunnicutt |
| 8,783,582 B2 | 7/2014 | Robertson |
| 8,785,382 B2 | 7/2014 | Kilpatrick |
| 8,789,768 B2 | 7/2014 | Hunnicutt |
| 8,925,837 B2 | 1/2015 | Walker |
| 9,079,202 B2 | 7/2015 | Walker |
| 9,174,227 B2 | 11/2015 | Robertson |
| 2001/0023901 A1 | 9/2001 | Haverstraw |
| 2002/0070289 A1 | 6/2002 | Hsu |
| 2002/0130202 A1 | 9/2002 | Kah, Jr. |
| 2002/0153434 A1 | 10/2002 | Cordua |

(56) References Cited

U.S. PATENT DOCUMENTS

| | | |
|---|---|---|
| 2003/0006304 A1 | 1/2003 | Cool et al. |
| 2003/0015606 A1 | 1/2003 | Cordua |
| 2003/0042327 A1 | 3/2003 | Beutler et al. |
| 2003/0071140 A1 | 4/2003 | Roman |
| 2003/0075620 A1 | 4/2003 | Kah, Jr. |
| 2004/0108391 A1 | 6/2004 | Onofrio |
| 2005/0006501 A1 | 1/2005 | Englefield |
| 2005/0161534 A1 | 7/2005 | Kah |
| 2005/0194464 A1 | 9/2005 | Bruninga |
| 2005/0194479 A1 | 9/2005 | Curtis |
| 2006/0038046 A1 | 2/2006 | Curtis |
| 2006/0086832 A1 | 4/2006 | Roberts |
| 2006/0086833 A1 | 4/2006 | Roberts |
| 2006/0108445 A1 | 5/2006 | Pinch |
| 2006/0144968 A1 | 7/2006 | Lev |
| 2006/0237198 A1 | 10/2006 | Crampton |
| 2006/0273202 A1 | 12/2006 | Su |
| 2006/0281375 A1 | 12/2006 | Jordan |
| 2007/0012800 A1 | 1/2007 | McAfee et al. |
| 2007/0034711 A1 | 2/2007 | Kah |
| 2007/0034712 A1 | 2/2007 | Kah |
| 2007/0181711 A1 | 8/2007 | Sesser |
| 2007/0235565 A1 | 10/2007 | Kah |
| 2007/0246567 A1 | 10/2007 | Roberts |
| 2008/0169363 A1 | 7/2008 | Walker |
| 2008/0217427 A1 | 9/2008 | Wang et al. |
| 2008/0257982 A1 | 10/2008 | Kah |
| 2008/0276391 A1 | 11/2008 | Jung |
| 2008/0277499 A1 | 11/2008 | McAfee et al. |
| 2009/0008484 A1 | 1/2009 | Feith |
| 2009/0014559 A1 | 1/2009 | Marino |
| 2009/0072048 A1 | 3/2009 | Renquist |
| 2009/0078788 A1 | 3/2009 | Holmes |
| 2009/0108099 A1 | 4/2009 | Porter |
| 2009/0140076 A1 | 6/2009 | Cordua |
| 2009/0173803 A1 | 7/2009 | Kah, Jr. |
| 2009/0173904 A1 | 7/2009 | Roberts |
| 2009/0188988 A1 | 7/2009 | Walker |
| 2009/0224070 A1 | 9/2009 | Clark |
| 2010/0090024 A1 | 4/2010 | Hunnicutt |
| 2010/0108787 A1 | 5/2010 | Walker |
| 2010/0176217 A1 | 7/2010 | Richmond |
| 2010/0257670 A1 | 10/2010 | Hodel |
| 2010/0276512 A1 | 11/2010 | Nies |
| 2010/0301135 A1 | 12/2010 | Hunnicutt |
| 2010/0301142 A1 | 12/2010 | Hunnicutt |
| 2011/0024522 A1 | 2/2011 | Anuskiewicz |
| 2011/0024526 A1 | 2/2011 | Feith et al. |
| 2011/0024809 A1 | 2/2011 | Janesick |
| 2011/0089250 A1 | 4/2011 | Zhao |
| 2011/0121097 A1 | 5/2011 | Walker |
| 2011/0147484 A1 | 6/2011 | Jahan |
| 2011/0248093 A1 | 10/2011 | Kim |
| 2011/0248094 A1 | 10/2011 | Robertson et al. |
| 2011/0248097 A1 | 10/2011 | Kim |
| 2011/0309161 A1 | 12/2011 | Renquist |
| 2012/0012670 A1 | 1/2012 | Kah, Jr. |
| 2012/0061489 A1 | 3/2012 | Hunnicutt |
| 2012/0153051 A1 | 6/2012 | Kah, Jr. |
| 2012/0292403 A1 | 11/2012 | Hunnicutt |
| 2013/0334332 A1 | 12/2013 | Robertson |
| 2013/0334340 A1 | 12/2013 | Walker |
| 2014/0027526 A1 | 1/2014 | Shadbolt |
| 2014/0027527 A1 | 1/2014 | Walker |

FOREIGN PATENT DOCUMENTS

| | | |
|---|---|---|
| CN | 2794646 | 7/2006 |
| CN | 2805823 | 8/2006 |
| DE | 1283591 B | 11/1968 |
| DE | 3335805 A1 | 2/1985 |
| EP | 463742 | 1/1992 |
| EP | 489679 | 6/1992 |
| EP | 518579 | 12/1992 |
| EP | 572747 | 12/1993 |
| EP | 646417 | 4/1995 |
| EP | 724913 | 8/1996 |
| EP | 0761312 A1 | 12/1997 |
| EP | 1016463 | 7/2000 |
| EP | 1043075 | 10/2000 |
| EP | 1043077 | 10/2000 |
| EP | 1173286 | 1/2002 |
| EP | 1250958 | 10/2002 |
| EP | 1270082 | 1/2003 |
| EP | 1289673 | 3/2003 |
| EP | 1426112 | 6/2004 |
| EP | 1440735 | 7/2004 |
| EP | 1452234 | 9/2004 |
| EP | 1502660 | 2/2005 |
| EP | 1508378 | 2/2005 |
| EP | 1818104 | 8/2007 |
| EP | 1944090 | 7/2008 |
| EP | 2255884 A1 | 1/2010 |
| EP | 2251090 A2 | 11/2010 |
| GB | 1234723 | 6/1971 |
| GB | 2330783 | 5/1999 |
| WO | WO 95 20988 | 8/1995 |
| WO | WO 9727951 | 8/1997 |
| WO | 9735668 | 10/1997 |
| WO | WO 0007428 | 12/2000 |
| WO | 0131996 | 5/2001 |
| WO | WO 0131996 | 5/2001 |
| WO | 0162395 | 8/2001 |
| WO | WO 0162395 | 8/2001 |
| WO | WO 02078857 | 10/2002 |
| WO | WO 02098570 | 12/2002 |
| WO | WO 03086643 | 10/2003 |
| WO | WO 2004052721 | 6/2004 |
| WO | 2005099905 | 10/2005 |
| WO | WO 2005115554 | 12/2005 |
| WO | WO 2005123263 | 12/2005 |
| WO | WO 2006108298 | 10/2006 |
| WO | WO 2007131270 | 11/2007 |
| WO | WO 2008130393 | 10/2008 |
| WO | WO 2009036382 | 3/2009 |
| WO | WO 2010036241 | 4/2010 |
| WO | WO 2010126769 | 11/2010 |
| WO | 2011075690 | 6/2011 |

OTHER PUBLICATIONS

Applicant-Initiated Interview Summary and Final Office Action mailed Mar. 5, 2014 for U.S. Appl. No. 12/972,271 (12 pgs.).

Applicant-Initiated Interview Summary mailed Mar. 5, 2014 for U.S. Appl. No. 12/859,159 (3 pgs.).

EPO Search Report and Opinion, dated Aug. 5, 2010 for EPO Application No. 10164085.2 (5 pgs.).

European Patent Office Search Report and Opinion dated Aug. 5, 2010 for Application No. 10164085.2 (5 pgs.).

Final Office Action mailed Apr. 5, 2011 for U.S. Appl. No. 11/947,571 (11 pgs.).

Final Office Action mailed Dec. 4, 2013 for U.S. Appl. No. 12/859,159 (12 pgs.).

Final Office Action mailed Dec. 5, 2013 for U.S. Appl. No. 12/972,271 (9 pgs.).

Interview Summary mailed Sep. 26, 2011 for U.S. Appl. No. 12/475,242 (3 pgs.).

Issue Notification mailed Jul. 2, 2014 for U.S. Appl. No. 12/859,159 (1 pg.).

Non-Final Office Action mailed Apr. 10, 2013 for U.S. Appl. No. 13/562,825 (22 pgs.).

Non-Final Office Action mailed Aug. 24, 2010 for U.S. Appl. No. 11/947,571 (11 pgs.).

Non-Final Office Action mailed Dec. 4, 2012 for U.S. Appl. No. 12/686,895 (29 pgs.).

Non-Final Office Action mailed Jan. 5, 2011 for U.S. Appl. No. 12/248,644 (20 pgs.).

Non-Final Office Action mailed Jul. 20, 2011 for U.S. Appl. No. 12/475,242 (17 pgs.).

Non-Final Office Action mailed Jun. 5, 2013 for U.S. Appl. No. 12/972,271 (25 pgs.).

(56) References Cited

OTHER PUBLICATIONS

Non-Final Office Action mailed Jun. 7, 2012 for U.S. Appl. No. 13/300,946 (9 pgs.).
Non-Final Office Action mailed Mar. 29, 2011 for U.S. Appl. No. 12/475,242 (7 pgs.).
Non-Final Office Action mailed May 24, 2013 U.S. Appl. No. 12/720,261 (67 pgs.).
Non-Final Office Action mailed May 29, 2013 for U.S. Appl. No. 12/859,159 (19 pgs.).
Non-Final Office Action mailed Oct. 12, 2012 for U.S. Appl. No. 13/300,946 (7 pgs.).
Non-Final Office Action mailed Oct. 15, 2012 for U.S. Appl. No. 13/562,825 (10 pgs).
Non-Final Office Action mailed Sep. 3, 2013 for U.S. Appl. No. 13/300,946. (5 pgs).
Non-Final Office Action mailed Sep. 30, 2010 for U.S. Appl. No. 12/248,644 (7 pgs.).
Notice of Allowability mailed Jun. 23, 2014 for U.S. Appl. No. 12/859,159 (6 pgs.).
Notice of Allowance and Fees Due mailed Mar. 14, 2014 for U.S. Appl. No. 12/859,159 (12 pgs.).
Response dated Apr. 29, 2011 to Office Action mailed Mar. 29, 2011 for U.S. Appl. No. 12/475,242 (13 pgs.).
Response dated Jul. 25, 2012 to Non-Final Office Action Apr. 25, 2012 for U.S. Appl. No. 12/757,912 (27 pgs.).
Response dated Jun. 25, 2012 to Office Action mailed Jun. 7, 2012 for U.S. Appl. No. 13/300,946 (12 pgs.).
Response dated Mar. 25, 2013 to Final Rejection dated Oct. 23, 2012 for U.S. Appl. No. 12/757,912 (20 pgs.).
Response dated Mar. 4, 2014 to Final Office Action mailed Dec. 4, 2013 for U.S. Appl. No. 12/859,159 (19 pgs.).
Response dated Nov. 24, 2010 to Office Action mailed Aug. 24, 2010 for U.S. Appl. No. 11/947,571 (19 pgs.).
Response dated Oct. 18, 2011 to Office Action mailed Jul. 20, 2011 for U.S. Appl. No. 11/947,571 (11 pgs.).
Response dated Oct. 18, 2011 to Office Action mailed Jul. 20, 2011 for U.S. Appl. No. 12/475,242 (17 pgs.).
Response dated Oct. 29, 2013 to Non-Final Office Action mailed May 29, 2013 for U.S. Appl. No. 12/859,159 (13 pgs.).
Response dated Sep. 16, 2013 to Office Action mailed Jun. 5, 2013 for U.S. Appl. No. 12/972,271 (15 pgs.).
U.S. Appl. No. 12/248,644, filed Oct. 9, 2008.
U.S. Appl. No. 12/475,242, filed May 29, 2009.
U.S. Appl. No. 12/720,261, filed Mar. 9, 2010.
U.S. Appl. No. 12/757,912, filed Apr. 19, 2010.
U.S. Appl. No. 12/859,159, filed Aug. 18, 2010.
U.S. Appl. No. 12/952,369, filed Nov. 23, 2010.
U.S. Appl. No. 13/495,402, filed Jun. 13, 2012.
U.S. Appl. No. 13/523,846, filed Jun. 14, 2012.
U.S. Appl. No. 13/560,423, filed Jul. 27, 2012.
U.S. Appl. No. 13/562,825, filed Jul. 31, 2012.
U.S. Appl. No. 13/828,582, filed Mar. 14, 2013.
U.S. Appl. No. 61/681,798, filed Aug. 10, 2012.
U.S. Appl. No. 61/681,802, filed Aug. 10, 2012.
U.S. Appl. No. 12/686,895, filed Jan. 13, 2010.
U.S Appl. No. 13/300,946, filed Nov. 21, 2011.
USPTO Applicant-Initiated Interview Summary and Non-Final Office Action dated Mar. 5, 2014 for U.S. Appl. No. 12/972,271 (12 pgs.).
USPTO Applicant-Initiated Interview Summary dated Apr. 23, 2013 for U.S. Appl. No. 12/757,912 (3 pgs.).
USPTO Final Rejection dated Dec. 5, 2013 for U.S. Appl. No. 12/972,271 (9 pgs.).
USPTO Final Rejection dated Oct. 23, 2012 for U.S. Appl. No. 12/757,912 (25 pgs.).
USPTO Non-Final Office Action dated Apr. 25, 2012 for U.S. Appl. No. 12/757,912 (45 pgs.).
USPTO Non-Final Office Action dated Jun. 5, 2013 for U.S. Appl. No. 12/972,271 (25 pgs.).
Written Opinion of the International Searching Authority and International Search Report date of mailing Apr. 19, 2011 for Application No. PCT/US10/61132 (12 pgs.).
Office Action dated Oct. 7, 2014 for U.S. Appl. No. 13/523,846.
USPTO; U.S. Appl. No. 13/523,846; Notice of Allowance mailed Feb. 23, 2015.
Interview Summary mailed Mar. 5, 2014 for U.S. Appl. No. 12/859,153 (3 pgs.).
Office Action dated Sep. 8, 2014 for U.S. Appl. No. 12/757,912.
USPTO; U.S. Appl. No. 12/757,912; Office Action dated May 14, 2015.
Office Action dated Oct. 7, 2014 for U.S. Appl. No. 13/523,846 (5 pgs.).
Notice of Allowance mailed Feb. 23, 2015 for U.S. Appl. No. 13/523,846 (5 pgs.).
Amendment dated Aug. 27, 2015 for U.S. Appl. No. 13/069,334 (9 pgs.).
Office Action mailed Sep. 3, 2015 for U.S. Appl. No. 13/069,334 (16 pgs.).
Amendment dated Jan. 4, 2016 for U.S. Appl. No. 13/069,334 (13 pgs.).
Notice of Allowance mailed Jun. 19, 2015 for U.S. Appl. No. 13/523,846 (25 pgs.).
Amendment dated Feb. 9, 2015 for U.S. Appl. No. 13/523,846 (12 pgs.).
Office Action mailed Oct. 7, 2014 for U.S. Appl. No. 13/523,846 (5 pgs.).
USPTO; U.S. Appl. No. 12/757,912; Notice of Allowance mailed Apr. 21, 2016.

\* cited by examiner

IRRIGATION SPRINKLER NOZZLE

CROSS-REFERENCE TO RELATED APPLICATION

This application claims the benefit of U.S. patent application Ser. No. 12/859,159, filed Aug. 18, 2010, and U.S. patent application Ser. No. 12/757,912, filed Apr. 9, 2010, the disclosures of which are hereby incorporated by reference in their entireties, and is a continuation-in-part of the '159 application, which in turn is a continuation-in-part of the '912 application.

FIELD

This disclosure relates generally to an irrigation sprinkler nozzle and, in particular, to an irrigation sprinkler nozzle having a deflector.

BACKGROUND

Efficient irrigation is a design objective of many different types of irrigation devices, such as gear-drive rotors, rotary spray nozzles, and fixed spray nozzles. That objective has been heightening due to concerns at the federal, state and local levels of government regarding the efficient usage of water. Over time, irrigation devices have become more efficient at using water in response to these concerns. However, those concerns are ongoing as demand for water increases.

As typical irrigation sprinkler devices project streams or sprays of water from a central location, there is inherently a variance in the amount of water that is projected to areas around the location of the device. For example, there may be a greater amount of water deposited further from the device than closer to the device. This can be disadvantageous because it means that some of the area to be watered will be over watered and some of the area to be watered will receive the desired about of water or, conversely, some of the area to be watered will receive the desired amount of water and some will receive less than the desired about of water. In other words, the distribution of water from a single device is often not uniform.

One measure of how uniformly water is applied to an area being watered is called Distribution Uniformity "DU", which is expressed as a percentage. One common measure of Distribution Uniformity is the Lower Quarter Distribution Uniformity ("$DU_{lq}$"), which is a measure of the average of the lowest quarter of samples, divided by the average of all samples:

$$DU_{lq} = \frac{\text{Average Catch of Lower Quarter} \times 100}{\text{Average Catch Overall}}$$

For example, if all samples are equal, the DU is 100%. If a proportion of the area greater than 25% receives zero application the DU will be 0%. DU can be used to determine the total watering requirement during irrigation scheduling. For example, one may want to apply not less than one inch of water to the area being watered. If the DU were 75%, then the total amount to be applied would be the desired about of water (one inch) divided by the DU (75%), or 1.33 inches of water would be required so that only a very small area receives less than one inch of water. The lower the DU, the less efficient the distribution and the more water that must be applied to meet the minimum desired. This can result in undesirable over watering in one area in order to ensure that another area receives the minimum water desired.

Another measurement is called the Scheduling Coefficient ("SC"). Unlike the DU, the scheduling coefficient does not measure average uniformity. Instead, it is a direct indication of the dryness of the driest turf areas (critical areas). The measurement is called the Scheduling Coefficient because it can play a role in establishing irrigation times. It is based on the critical area to be watered. To calculate the SC, one first identifies the critical area in the water application pattern which is receiving the least amount of water. The amount of water applied to this critical area is divided into the average amount of water applied throughout the irrigated area to obtain the Schedule Coefficient. The scheduling coefficient indicates the amount of extra watering needed to adequately irrigate the critical area. If perfect uniformity were obtained, the scheduling coefficient would be 1.0 (no extra watering needed to adequately irrigate the critical area). By way of example, assume that an irrigation pattern has a scheduling coefficient of 1.8. After 15 minutes of irrigation, a critical area would still be under-watered due to non-uniformity. It will take an additional 12 minutes (15 minutes×1.8) to apply an adequate amount of water to the critical area (or 27 minutes total). While that is the amount of time needed to water the critical area, the result is that other areas will be over-watered.

There are many applications where conventional spray nozzle irrigation devices are desirable for use. Unfortunately, conventional spray nozzle irrigation devices can undesirably have lower $DU_{lq}$ values. For example, some conventional fixed spray devices can have $DU_{lq}$ values of about 65% and be considered to have a very good rating, $DU_{lq}$ values of about 70% for rotors are considered to have a very good rating.

SUMMARY

Spray nozzles having adjustable arcuate discharge openings are described herein, where positive indexing provides an indication of the arcuate extent of the spray pattern in a plurality of preset locations. The use of preset locations can advantageously provide for improved retention of a given arcuate setting, audible and/or tactile feedback to a user, improved ease of rotation between arcuate settings, and/or improved edge appearance and/or performance of the adjustable edge of the spray pattern.

Furthermore, such spray nozzles can cooperate with the deflector and other flow regulating features disclosed in U.S. patent application Ser. No. 12/757,912, wherein the nozzles have deflectors that are configured with depending ribs having micro-structures that cooperate with other geometry of the rib and deflector to define a plurality of different micro-ramps for dividing the discharged water into different sprays having different characteristics. The different sprays with the different characteristics combine to provide for an improved spray pattern. The result is that advantageously higher $DU_{lq}$ and lower SC values can be achieved, including in a variable arc nozzle.

Water is discharged through one or more flow openings upstream of the deflector in a direction that is generally parallel a central axis of the nozzle (or at an angle from perpendicular thereto). When the discharged water hits an inclined portion of the deflector, the deflector redirects the water outwardly, with the ribs generally confining the water to being radially outwardly. However, the momentum of the water reacts to the impact with the deflector by wanting to move outwardly against the bottom of channels formed between adjacent pairs of the ribs as well against the sidewalls of the ribs. Essentially, the behavior of the water upon impact with the deflector is such that a significant fraction wants to remain close to the structure as opposed to completely filling the channels. In other words, a large fraction of the water tends to "ride along" the sides of the ribs and the bottom of the channels. In order to take advantage of this behavior of the discharged water, very minute structural variances in the portions of the deflector that the water comes into contact with can have a significant impact on the water passing thereagainst. That is, making non-uniform ribs, such as with steps or other protuberances or variations, can provide micro-ramps for altering the flow pattern of the water thereagainst as compared to adjacent water flows. In this manner, the discharging flow of water can be segregated by the deflector into different sprays having different characteristics which can be tailored to achieve certain objectives, such as sprays that are intended to irrigate different areas which, when combined, can result in a more efficient irrigation spray pattern.

In one aspect, a spray nozzle is provided having a deflector body downstream of a flow opening to deflect water discharge from the flow opening. The deflector body has a plurality of depending ribs forming channels for water flow therebetween, and a plurality of the ribs each have an outwardly-extending step at least partially along the length of the ribs such that a micro-ramp extends into the channels for directing a portion of the water flow.

In another aspect, a spray nozzle is provided having a base having a longitudinal axis and at least one water passage extending through base. A deflector body has an upper deflector portion and a lower neck and is fixed relative to the base. The deflector body has a plurality of radially-outward extending, depending ribs forming channels for water flow therebetween, where the ribs each having a pair of sidewalls and a bottom wall with the sidewalls each having a primary micro-ramp projecting laterally a first distance from the sidewall and spaced from a bottom of the channel to define a primary path for water flow outwardly from the nozzle.

In either of the foregoing aspects, the spray nozzle may be of a fixed-arc type or a variable arc-type. In the case of a variable arc-type spray nozzle, a first nozzle body may be provided having a first helical surface. A second nozzle body can be rotatably associated with the first nozzle body and can include a second helical surface. The first and second helical surfaces are configured to cooperate to define an arcuate flow opening adjustable in size to determine an arc of water distribution upon rotation of the first nozzle body relative to the second nozzle body. In one example, the second nozzle body can be in the form of a collar and the first nozzle body can include a deflector that are mounted for relative rotation. The collar has a collar helical surface configured to cooperate with a deflector helical surface of the deflector to define an arcuate flow opening, upstream of an upper deflector portion, which is adjustable in size to determine an arc of water distribution upon rotation of the collar relative to the deflector.

A method is also provided for distributing water from the spray nozzle which includes the step of deflecting at least some of the water radially outward along a plurality of flow paths disposed between adjacent pairs of the ribs and the bottom of the channels, a first of the flow paths on a side of the steps closer to the bottom wall having a first fraction of the total discharged water volume and a second of the flow paths on a side of the step opposite the bottom wall having a second fraction of the total discharged water volume, the second fraction being different than the first fraction.

In any of the foregoing aspects, the deflector body may optionally have an upper portion with an underside with the depending ribs thereon and a lower portion with a neck depending from the underside with a plurality of flow notches disposed about its outer periphery. The flow notches may be aligned with channels formed between the ribs such that a water flow path extends through the flow notches into the channels.

DETAILED DESCRIPTION

As shown in the exemplary drawings, new and improved sprinkler spray nozzles for use in irrigation are provided. Each of the spray nozzles has a deflector that provides for the separation of discharging water into different sprays in order to improve the overall spray pattern and, in particular, the $DU_{lq}$ and SC values associated with the spray nozzle. Unlike conventional spray nozzles, which often have deflectors with simple, radially-extending vanes, the exemplary embodiments each have a deflector with depending ribs, where the ribs in turn each have one or more micro-ramps or other structures protruding into the flow paths of the water which guide the deflected water flow in different sprays which can have different characteristics. The different sprays with the different characteristics combine to provide for an improved spray pattern. Moreover, the spray pattern can be tailored by adjusting the geometries of the micro-ramps and the ribs depending upon the desired application or irrigation spray pattern. In one aspect, the deflector can receive discharging water from an arcuately-adjustable opening such that the arc of the spray pattern can be adjusted. However, the deflector described herein and, in particular, the division of the deflected fluid, can also be incorporated into a fixed spray-type sprinkler nozzle or a rotary-type sprinkler nozzle.

Figure 1:
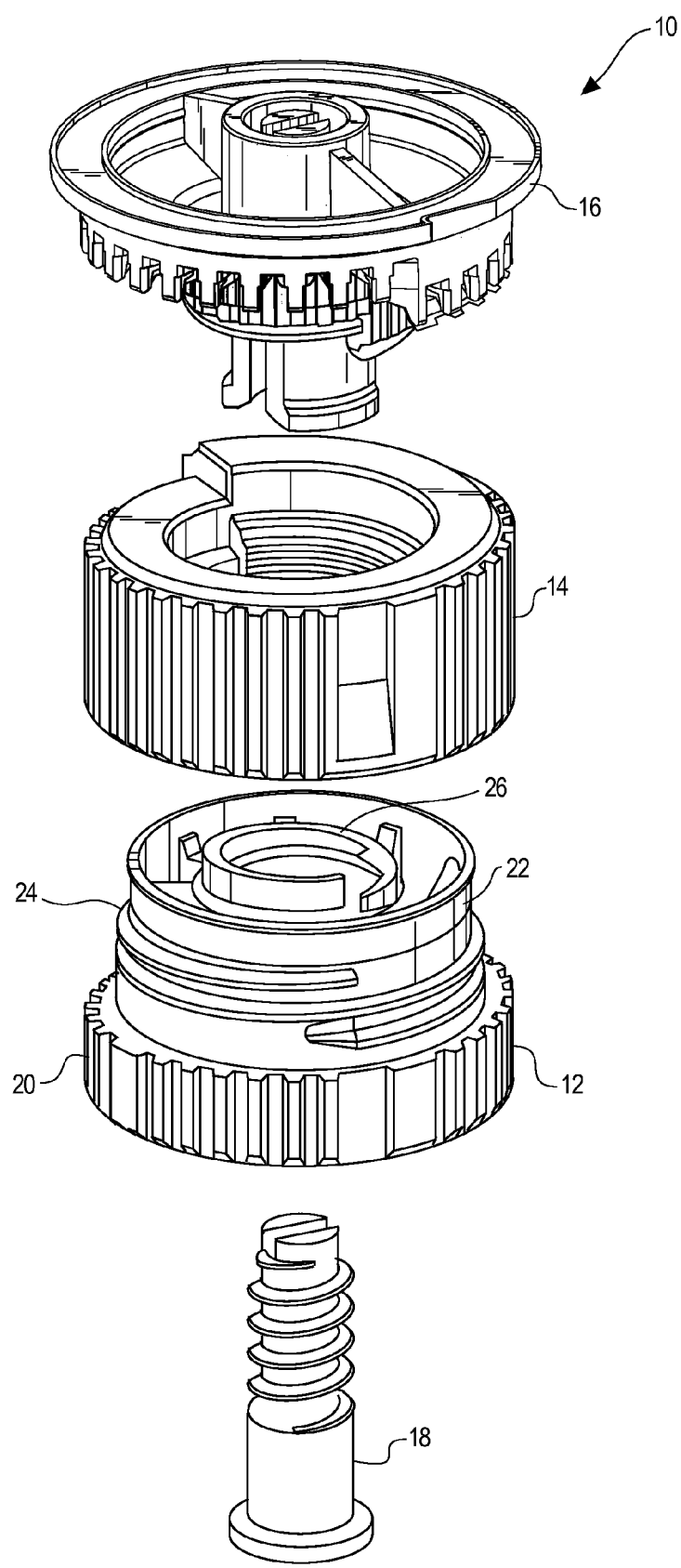
FIG. 1 is an exploded perspective view of an exemplary embodiment of a variable arc irrigation nozzle, depicting a deflector, a collar, a base and an adjustment screw, where the deflector includes a plurality of radially-extending ribs forming channels for water flow therebetween, the ribs having micro-ramps configured for providing different aspects of the spray pattern.
Figure 2:
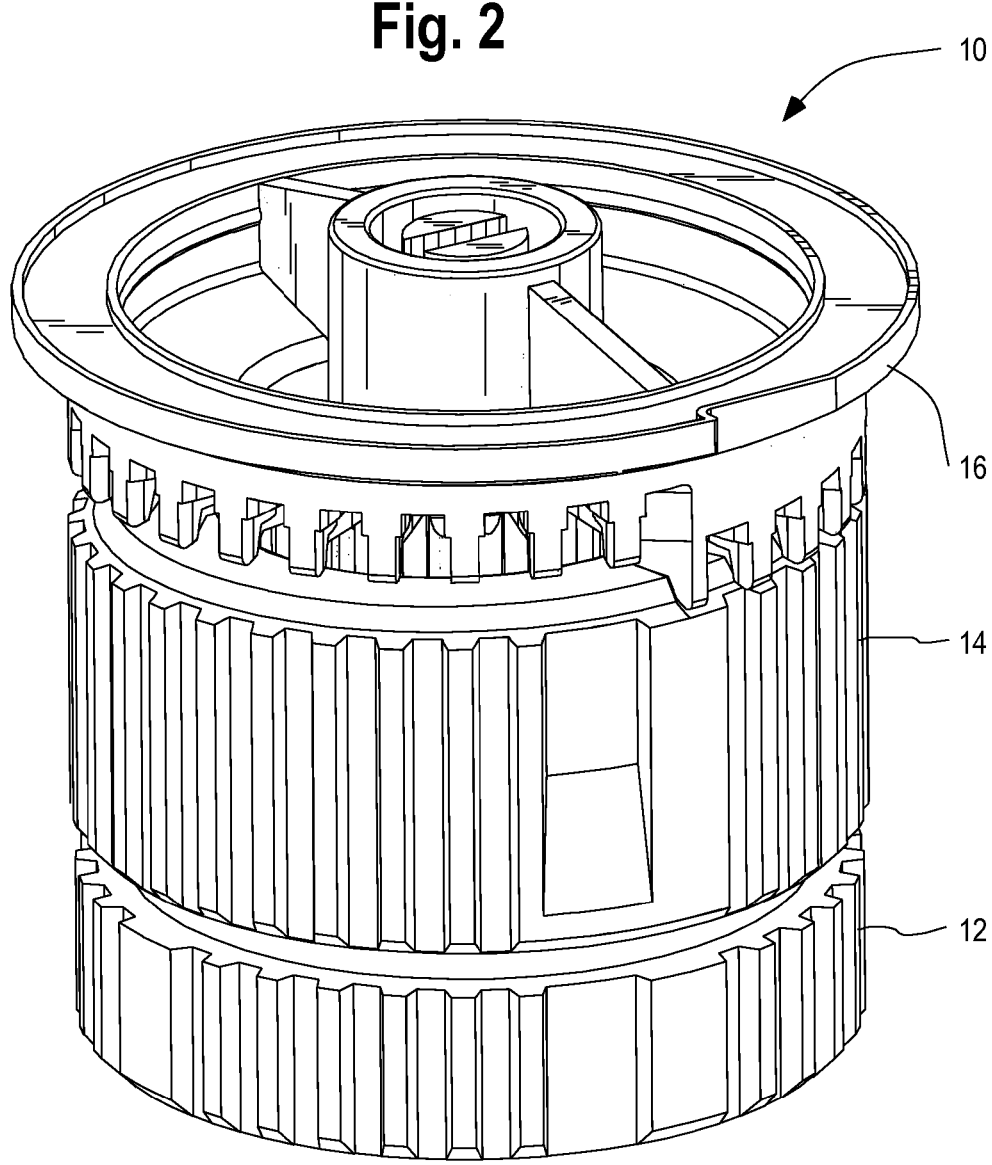
FIG. 2 is a perspective view of the variable arc irrigation nozzle of FIG. 1 in an assembled configuration.
Figure 3:
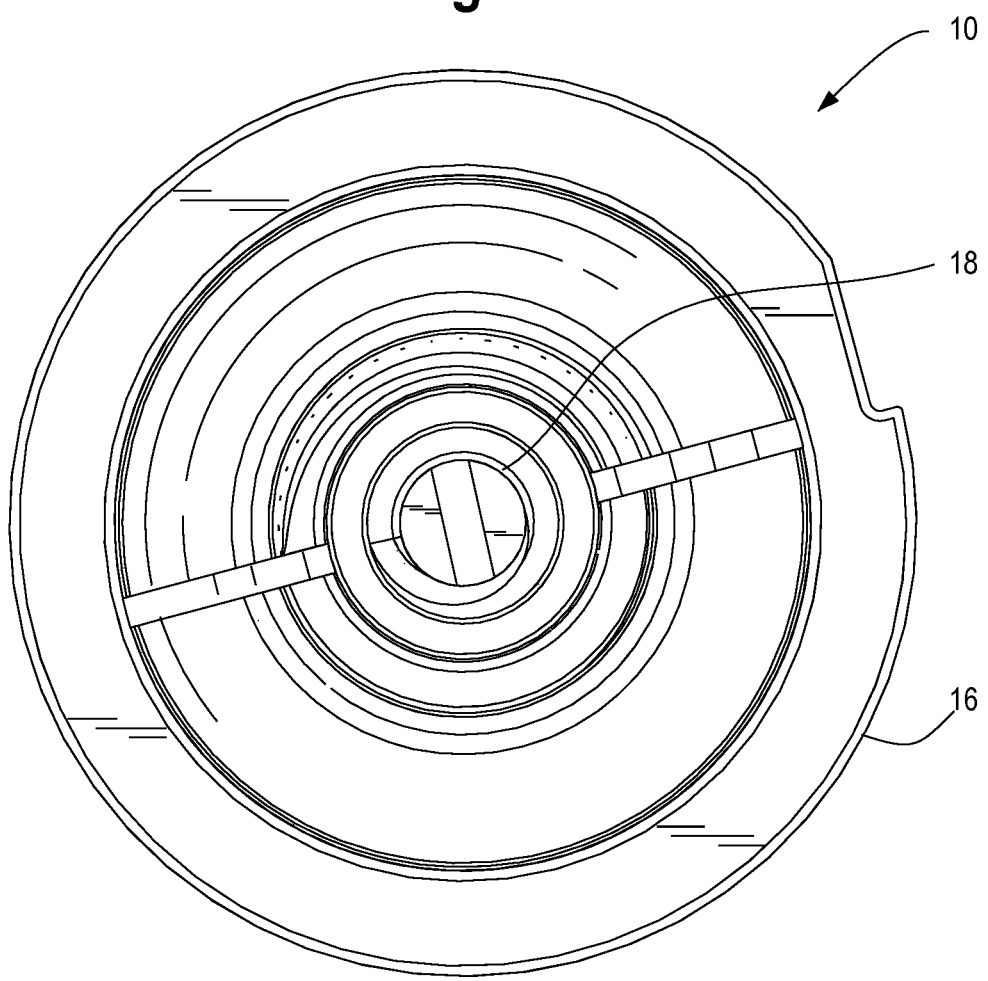
FIG. 3 is a top plan view of the assembled variable arc irrigation nozzle of FIG. 1.
Figure 4:
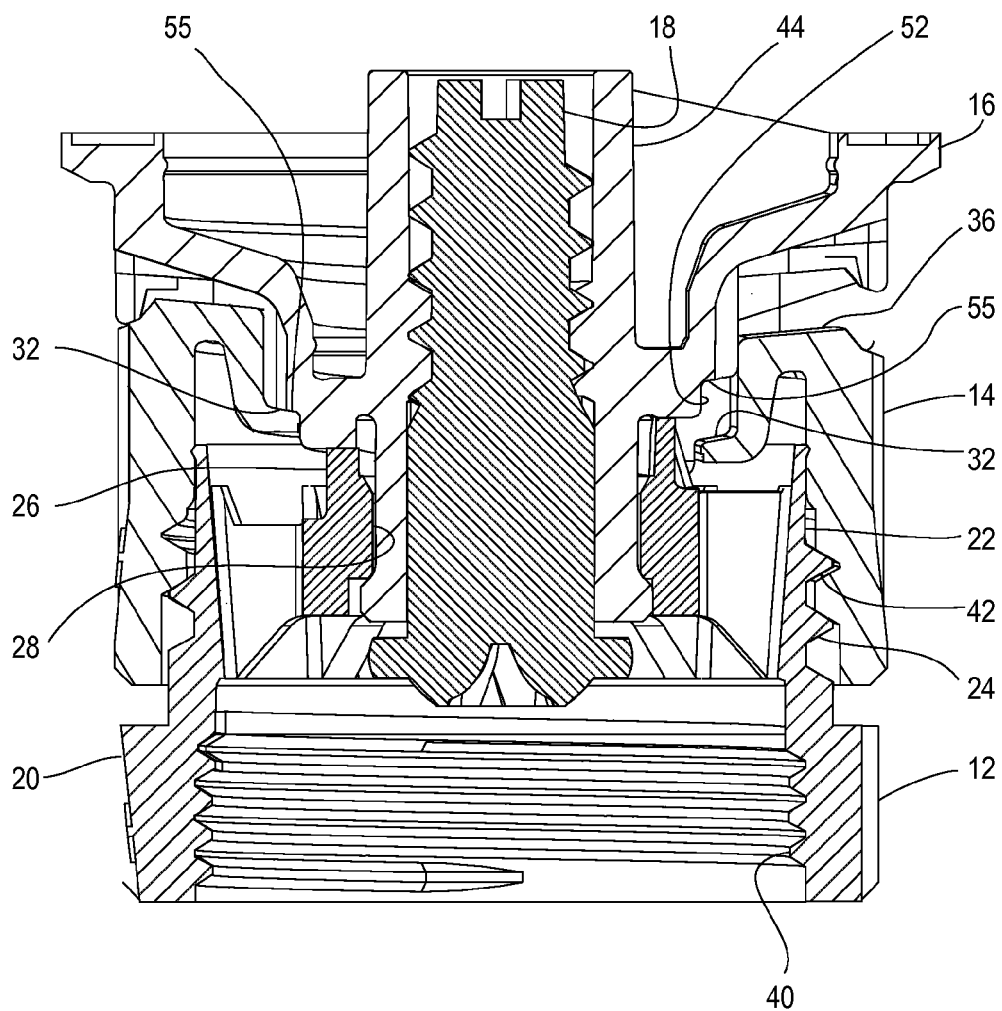
FIG. 4 is a cross-section view of the assembled variable arc irrigation nozzle taken along line IV-IV of FIG. 3.
Figure 12:
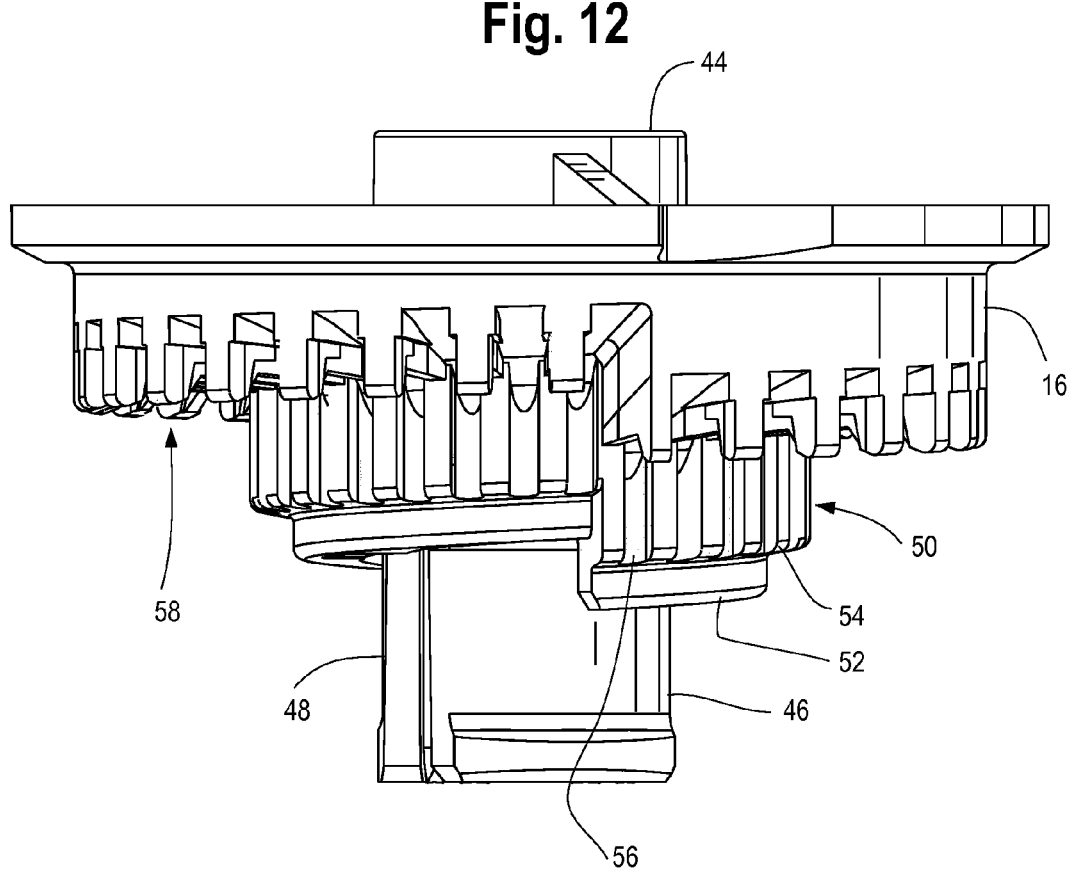
FIG. 12 is a side elevation view of the deflector of the variable arc irrigation nozzle of FIG. 1.

In an exemplary embodiment, a spray nozzle 10 for an irrigation device includes a base 12, a collar 14, a deflector 16 and a screw 18, as illustrated in FIG. 1. The base 12 includes a lower skirt 20 and an upper skirt 22, both surrounding a central opening. The lower skirt 20 includes internal threads 40 (illustrated in FIG. 4) to allow the base 12 (and hence the assembled nozzle 10) to be threadingly connected to a riser, stand or the like of a sprinkler for receiving pressurized water. The upper skirt includes external threading 24 configured to mate with internal threading 42 of the collar 14, as shown in FIG. 4. The collar 14 can be rotated relative to the base 12 along the mating threads 24 and 42 such that the collar 14 can rotate about the base 12. The deflector 16 includes an upper deflector surface 58 with a depending neck 50, as illustrated in FIG. 12. The deflector surface 58 is disposed on an opposite side of the collar 14 from the base 12, and the neck 50 of the deflector 16 extends through the collar 14 and partially into the central opening of the base 12, as depicted in FIG. 4. The depending neck 50 of the deflector 16 is adapted to be attached to the base 12, as will be described in greater detail herein, such that the deflector 16 is not rotatable relative to the base 12. The screw 18 may be an adjustable flow rate adjustment screw to regulate water flow through the nozzle 10.

Figure 6:
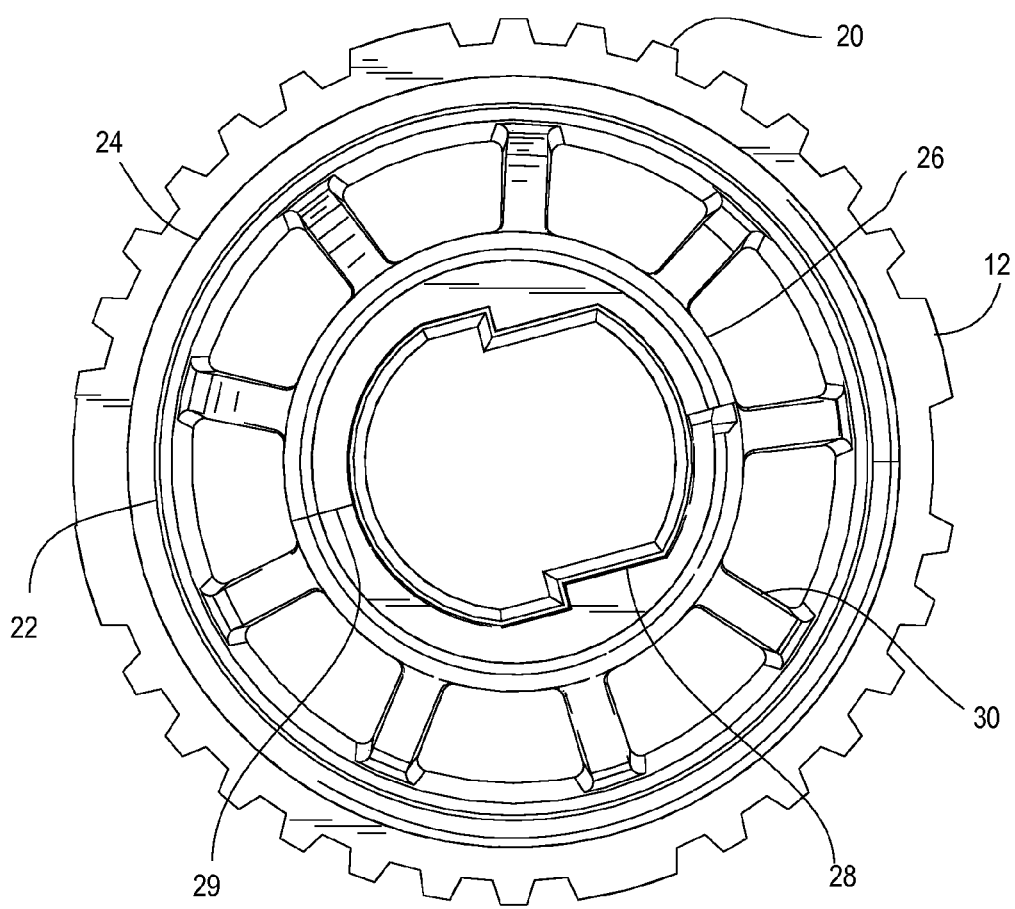
FIG. 6 is a top plan view of the base of the variable arc irrigation nozzle of FIG. 1.
Figure 8:
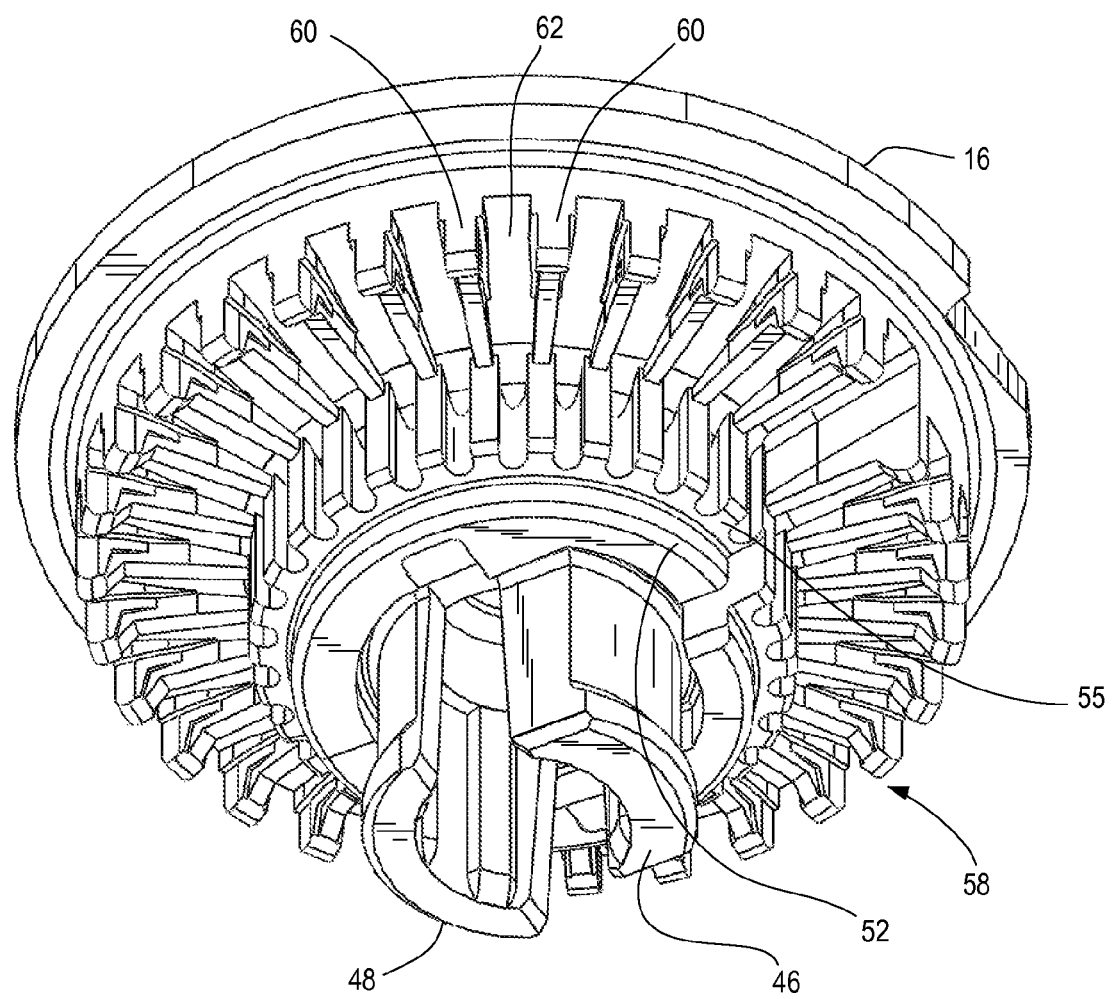
FIG. 8 is a perspective view of the underside of the deflector of the variable arc irrigation nozzle of FIG. 1.

The deflector 16 is attached to the base 12 via engagement between a pair of depending prongs 46 and 48 of the neck 50 and structure surrounding the central opening of the base 12. More specifically, the base 12 includes an interior center disc 26 supported in spaced relation from the upper skirt 22 via a plurality of connecting webs 30, as depicted in FIG. 6. The central opening 28 extends through the disc 26. Barbed ends of the prongs 46 and 48 are configured to extend through the central opening 28 to form a cantilever snap fit to secure the deflector 16 relative to the base 12 with the collar 14 therebetween. Further, the central opening 28 is optionally key-shaped or otherwise asymmetric in at least one direction. When one of the prongs 48 is larger than the other of the prongs 46 in its arcuate extent, as depicted in FIG. 8, the key-shaped central opening 28 and the differently-sized prongs 46 and 48 can cooperate to ensure that the deflector 16 can only be attached to the base 12 in a single preferred orientation.

Figure 7:
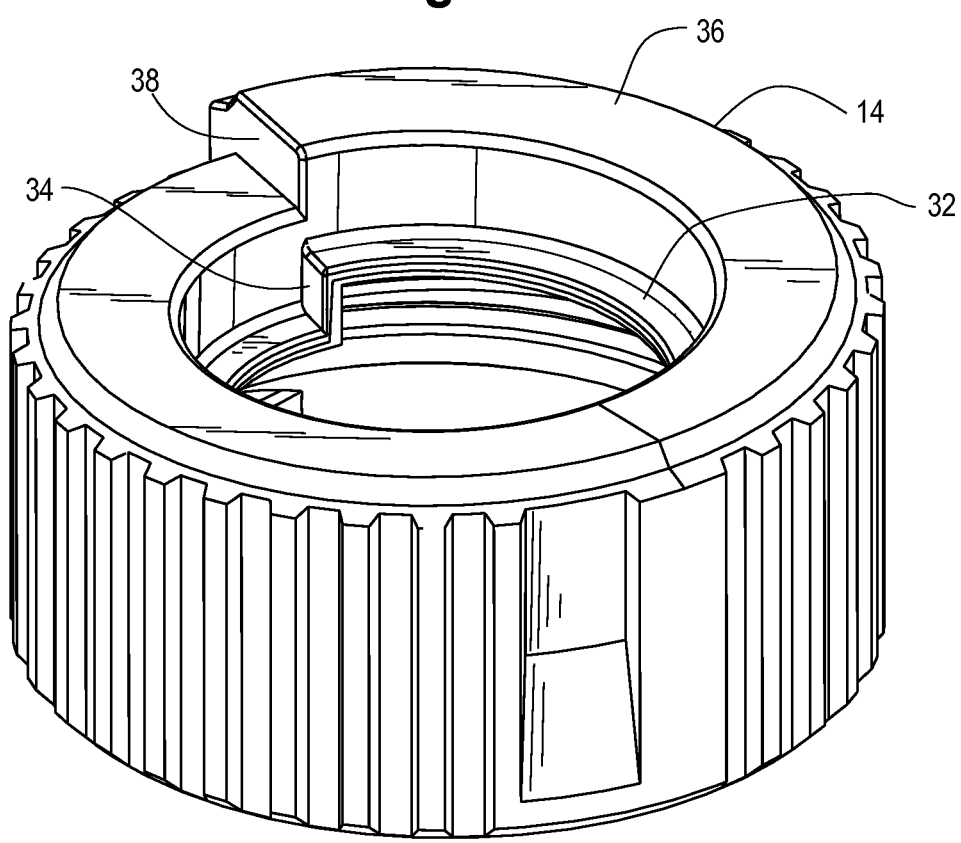
FIG. 7 is a perspective view of the collar of the variable arc irrigation nozzle of FIG. 1.

The illustrated embodiment of the nozzle 10 includes variable arc capability such that the arcuate extent of the spray pattern emanating from the nozzle 10 can be adjusted. The collar 14 includes a radially-inward extending helical ledge 32, as illustrated in FIG. 7. Ends of the ledge 32 are axially spaced and are connected by an axially-extending wall 34. The ledge 32 has an upwardly-facing surface and a radially-inward edge surface. An upper face 36 of the collar 14 is also helical, having the same pitch as the ledge 32 and with ends thereof joined by an axially extending face wall 38, also as illustrated in FIG. 7. The neck 50 of the deflector 16 includes a downward-facing helical surface 55 and a depending, radially-outward facing helical wall 52, as illustrated in FIG. 8, both of which have the same pitch as the ledge 32 of the collar 14. The downward-facing helical surface 55 of the deflector 16 lies over the ledge 32 of the collar 14.

As the collar 14 is rotated relative to the deflector 16, however, the radially-inward edge surface of ledge 32 of the collar 14 is brought into or out of sliding and sealing engagement with the helical wall 52 of the deflector 16 in order to increase or decrease the arcuate extent of a water discharge opening. In a fully closed position, the radially-inward edge surface of the ledge 32 of the collar and the helical wall 52 of the deflector 16 are sealingly engaged to block water flow through the spray nozzle. Rotation of the collar 14 then increase the axially spacing between the edge surface of the ledge 32 of the collar and the helical wall 52 of the deflector 16 such that they have overlying segments that are not sealingly engaged through which the water discharge opening is defined. In this manner, the arcuate extent of the water discharge opening, and thereby the arcuate extent of the spray, can be readily adjusted. By way of example, the collar 14 in FIG. 4 has been rotated to a position whereby the water discharge opening is about 180-degrees. As can be seen on the left side of FIG. 4, the edge surface of the ledge 32 of the collar 14 is sealingly engaged with the helical wall 52 of the deflector 16 but on the right side they are axially spaced.

Turning now to details of the upper deflector surface 58 of the deflector 16, a plurality of radially-extending ribs 60 depend from the underside, as illustrated in FIGS. 8-11. Discharge channels for water are formed between adjacent ribs and have bottoms 62 coinciding with the underside of the upper deflector surface 58. The ribs 60 are each configured to divide the water flow through the channels into different sprays directed to different areas and thereby having different characteristics. The different sprays with the different characteristics are combined to provide for an improved spray pattern having improved $DU_{lq}$ and SC values as compared to conventional spray nozzles, including conventional spray nozzles configured for variable arc adjustment, as will be discussed in greater detail herein.

Figure 10:
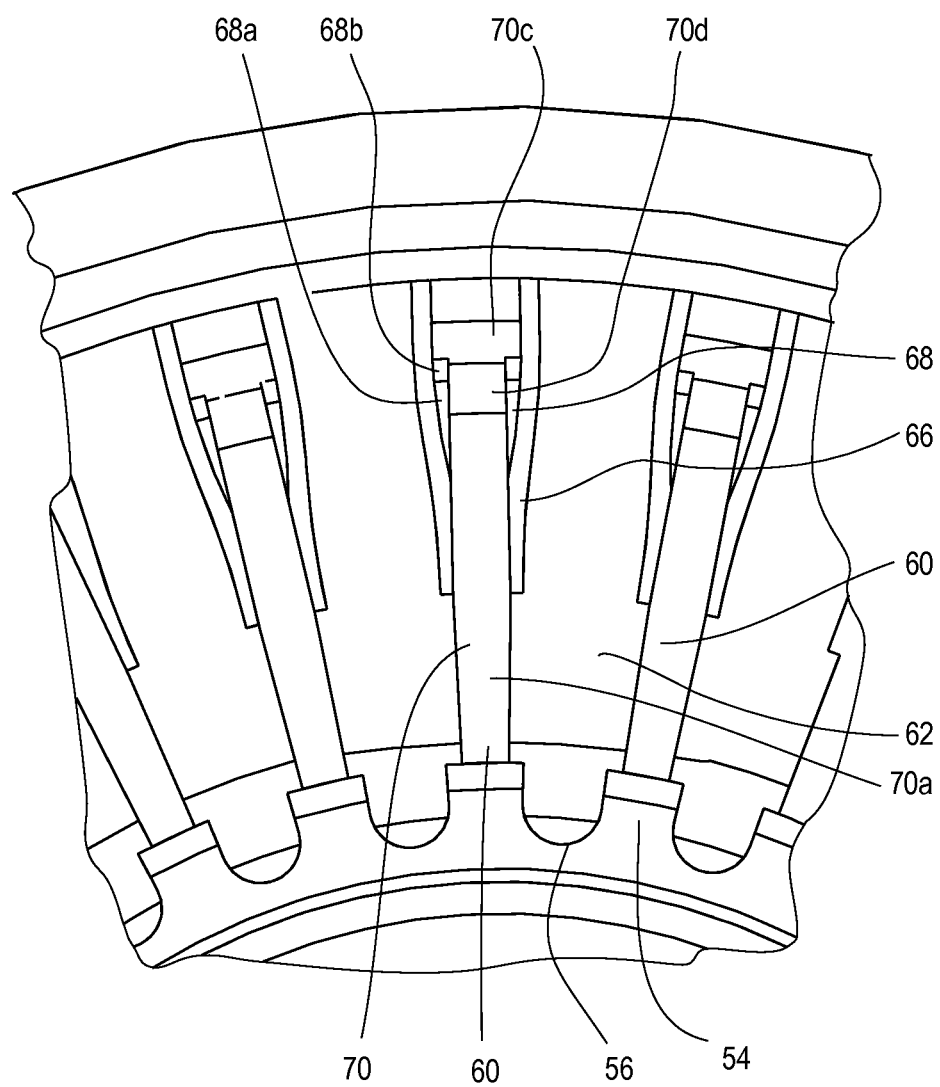
FIG. 10 is a detailed bottom plan view of a portion of the underside of the deflector of the variable arc irrigation nozzle of FIG. 1.
Figure 11:
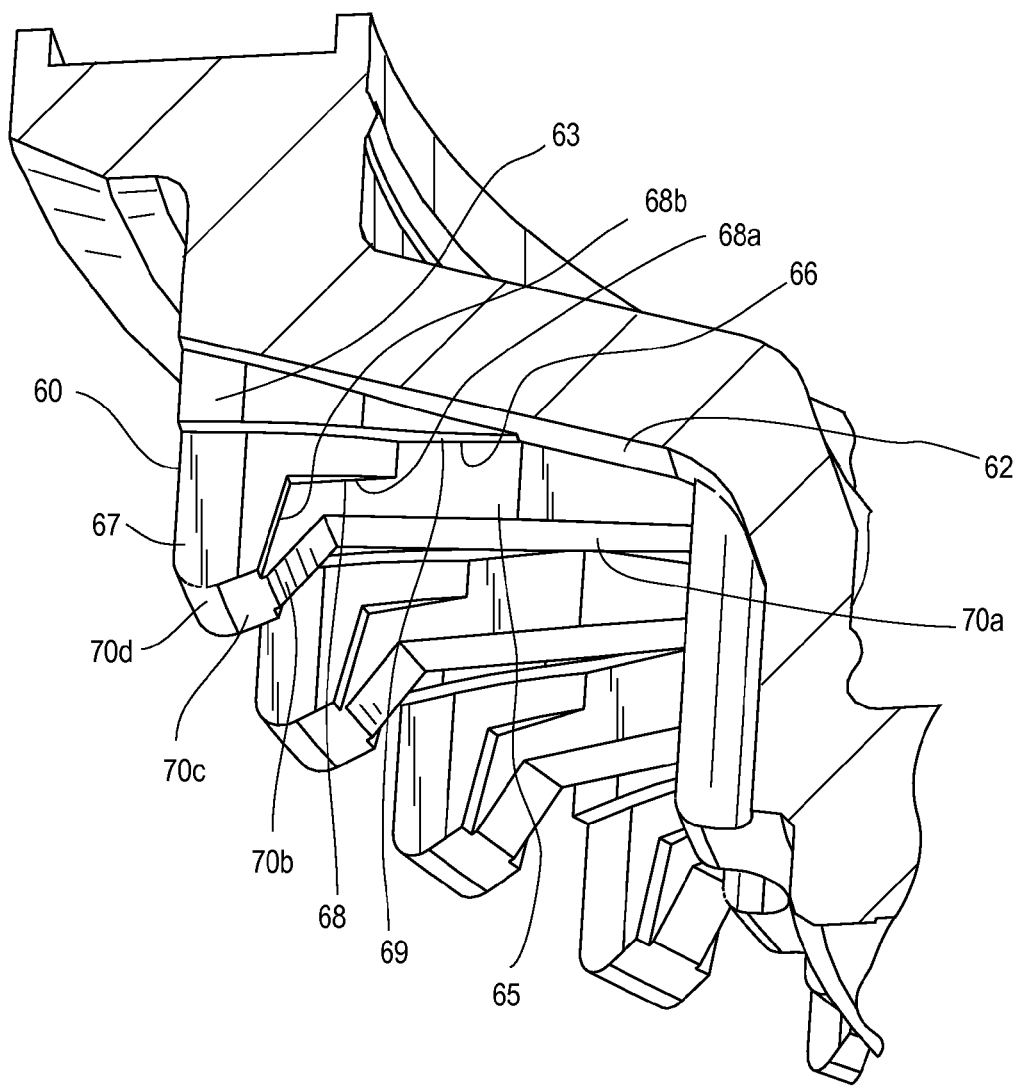
FIG. 11 is a perspective view of a section of the deflector of the variable arc irrigation nozzle of FIG. 1 showing details of the ribs.

Each of the ribs 60 has an inner end adjacent the neck 50, and outer end radially outward from the neck 50, a pair of sidewalls and a bottom wall 70. As the ribs 60 are each generally symmetric about a radially-extending line, only one of the sides of a representative rib 60 will be described with it being understood that the opposite side of that same rib 60 has the same structure. With reference to FIGS. 10 and 11, the rib 60 has a first step 66 forming in part a first micro-ramp and a second step 68 defining in part a second micro-ramp. The first step 66 is generally linear and positioned at an angle closer to perpendicular relative to a central axis of the deflector as compared to the bottom 62 of the upper deflector surface 58, as shown in FIG. 11. The second step 68 is segmented, having an inner portion 68a that extends closer to perpendicular relative to the central axis as compared to an outer portion 68b, which has a sharp downward angle.

The first and second steps 66 and 68 divide the sidewall into three portions having different thicknesses: a first sidewall portion 63 disposed adjacent an outward region of the bottom 62 of the upper deflector surface 58; a second, narrower sidewall portion 67 disposed partially on an opposite side of the first step 66 from the first sidewall portion 63; and a third, yet narrower sidewall portion 65 having an outer region disposed on an opposite side of the second step 68 from the first step 66, a middle region disposed on an opposite side of the first step 66 from the bottom 62 of the upper deflector surface 58, and an inner region disposed adjacent the bottom 62, as depicted in FIG. 11. The outer portion 68b of the second step 68 is spaced inwardly from the outer end of the rib 60 by a second sidewall portion 67. An inclined sidewall segment 69 is disposed radially inward from the second sidewall portion 67.

The underside or bottom wall 70 of the rib 60 has a first, generally linear segment 70a positioned at an angle closer to perpendicular relative to a central axis of the deflector 16 as compared to an inner, inclined intermediate segment 70b and the bottom 62 of the upper deflector surface 58, as shown in FIG. 11. An outer, inclined intermediate segment 70c is closer to perpendicular than the inner intermediate segment 70b but not as close to perpendicular as the first segment 70a. An upwardly curved segment 70d is disposed at the end of the rib 60.

Figure 5:
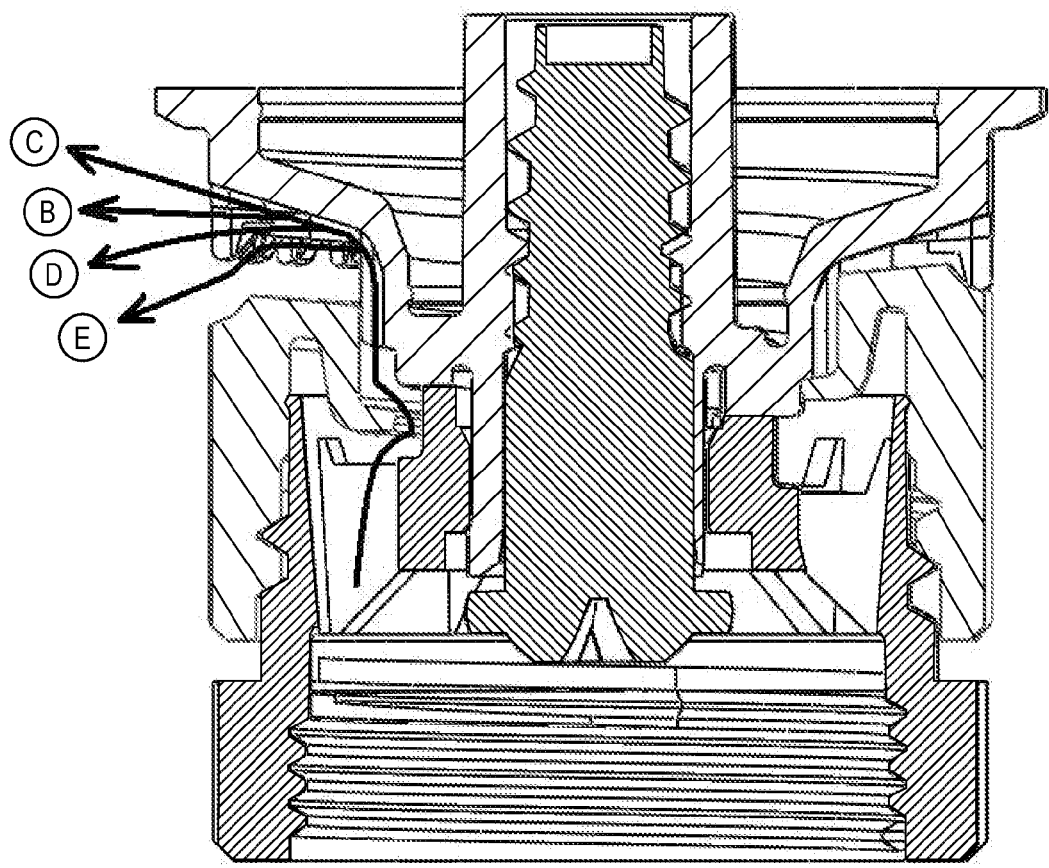
FIG. 5 is a cross-section view of the assembled variable arc irrigation nozzle similar to FIG. 4, but showing diagrammatic flow paths discharging from the nozzle.
Figure 14:
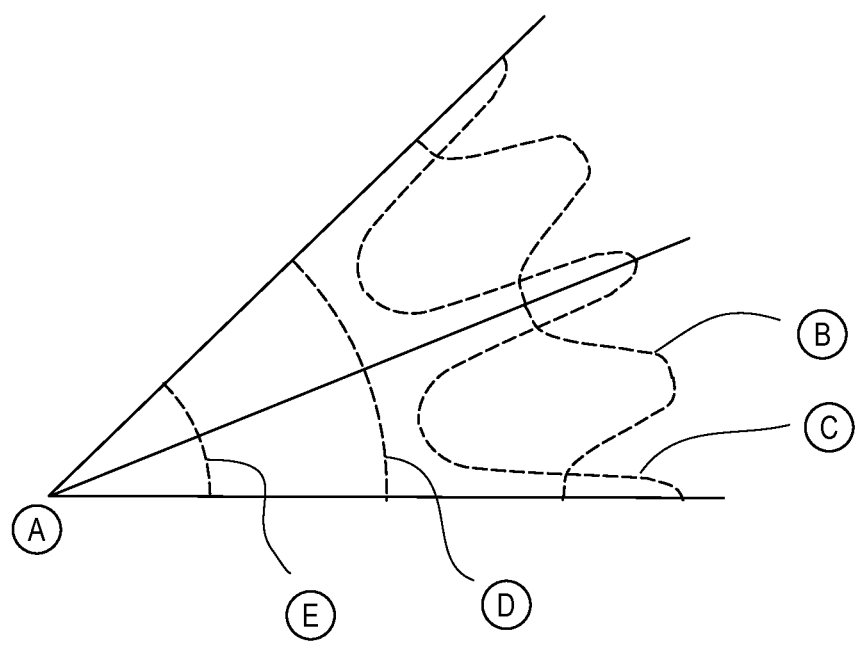
FIG. 14 is a schematic diagram depicting an idealized flow discharging from the variable arc irrigation nozzle of FIG. 1.

The geometries of the ribs 60 and the bottom 62 of the of the upper deflector surface 58 cooperate to define a plurality of micro-ramps which divide the discharging water into sprays having differing characteristics. More specifically, and with reference to FIGS. 5 and 14, there is a first spray B, a second spray C, a mid-range spray D and a close-in spray E as measured from the location A of the spray nozzle 10. The first and second sprays B and C may combine or may be coextensive to form a primary spray. The first and second sprays B and C can have the furthest throw, but may be angularly offset from each other to minimize gaps between the sprays. The mid-range spray D and the close-in spray E are progressively closer to the location A of the spray nozzle 10, as depicted in FIG. 14. When the different sprays are combined, the result is a spray pattern which provides for improved $DU_{lq}$ and SC values as compared to conventional arcuately adjustable, fixed spray nozzles.

Figure 13:
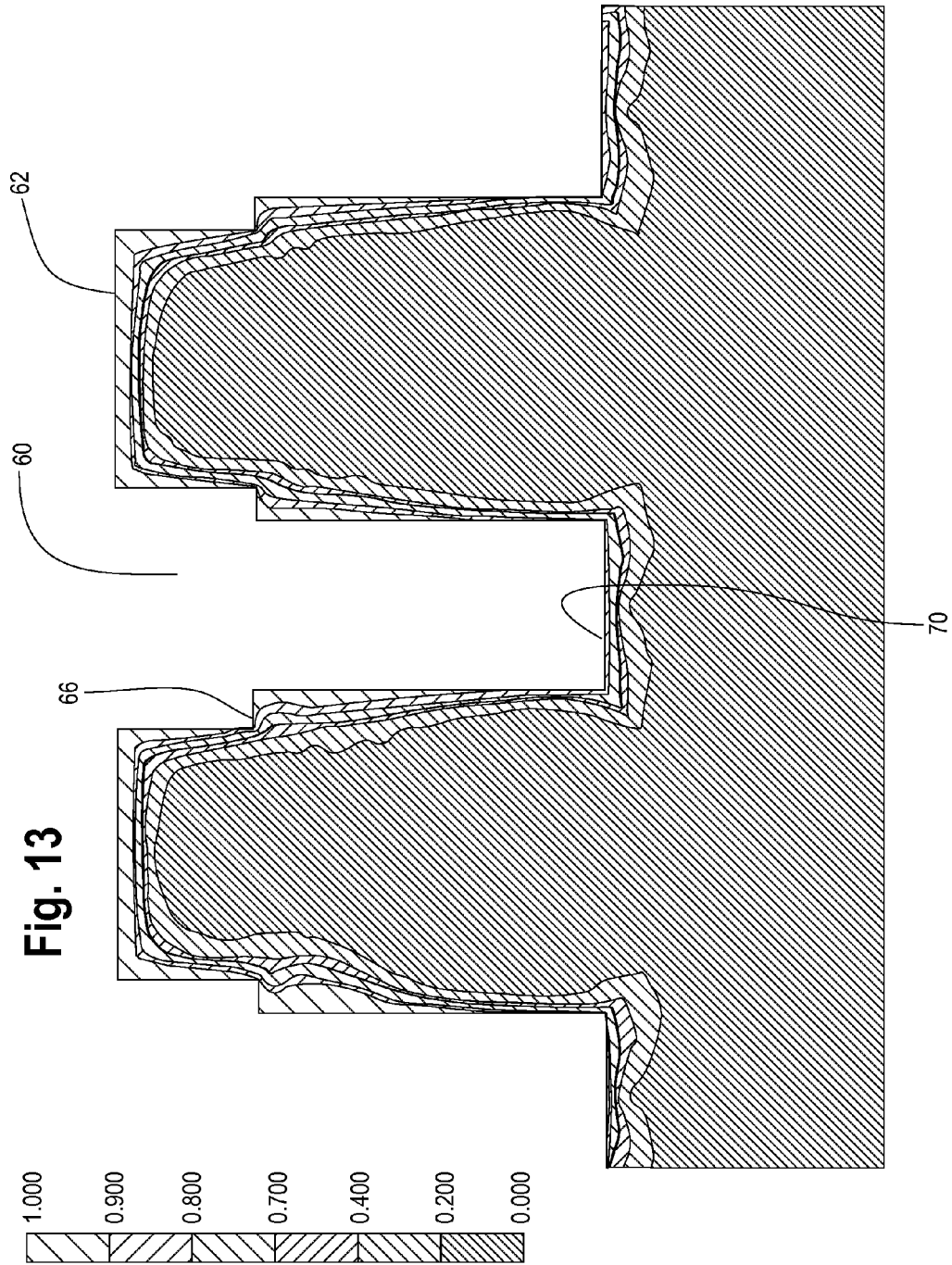
FIG. 13 is an image based upon CFD analysis of water flow along the ribs of the variable arc irrigation nozzle of FIG. 1.

The micro-ramp associated with the first spray B is defined by the first step 66 and the adjacent portions of the sidewall of the rib 60, such as portion of sidewall segment 65, 69 and 67, with reference to FIG. 11. The micro-ramp associated with the second spray C is defined by the bottom 62 of the upper deflector surface 58 and the adjacent portions of the sidewall of the rib 60, such as segment 63, also with reference to FIG. 11. As can be seen from the image of FIG. 13 from the CFD analysis of the water flow, the vast majority of the water tends to flow immediately adjacent the ribs 60 and the bottom 62 of the channels and opposed to evenly filling the space between the ribs 60. Accordingly, the position of the first step 66 relative to the bottom 62 can be selected to vary the amount or fraction of the water flowing along the first micro-ramp as opposed to the second micro-ramp. For example, moving the first step 66 closer to the bottom 62 will increase the depth of the first micro-ramp and thereby increase its fraction of water as compared to the second micro-ramp. As shown in this example, there is a greater fraction of the water flow in the first micro-ramp as compared to the second micro-ramp.

In order to provide for the phase shifting of the spray from the first micro-ramp relative to the spray from the second micro-ramp, the outward ends 67 of the sidewalls of the ribs 60 narrow or taper toward each other, such that a pair of sub-sprays each flowing along the primary micro-ramp on opposite sides of the same rib 60 combine to form a common primary spray. This angularly shifts the first spray from being directly radially outward in the direction of the bottom 62 of the channels.

The micro-ramp associated with the mid-range spray D is defined by second step 68 and those portions of the sidewall of the rib 60 on an opposite thereof from the first step 66, such as a portion of sidewall segments 65. The sharply inclined end segment 68b is configured to direct the water spray more downwardly as compared to the spray from the first micro-ramp. Finally, the micro-ramp associated with the close-in spray E is defined by the underside 70 of the rib 60, including the downturned end segments 70b and 70c, for directing the water flow a shorter throw as compared to the mid-range spray D, the second spray C and the first spray B. It will be understood that the geometries, angles and extend of the micro-ramps can be altered to tailor the resultant combined spray pattern. Further, while it is presently believed to be preferable to have all or nearly all (at least about 80%, 85%, 90%, or 95%) of the ribs 60 with the micro-ramps, it is foreseeable that in some circumstances it may be preferable to have less than all of the ribs include micro-ramps. For instance, the micro-ramps may be on only one side of each of the ribs, may be in alternating patterns, or the like.

Figure 9:
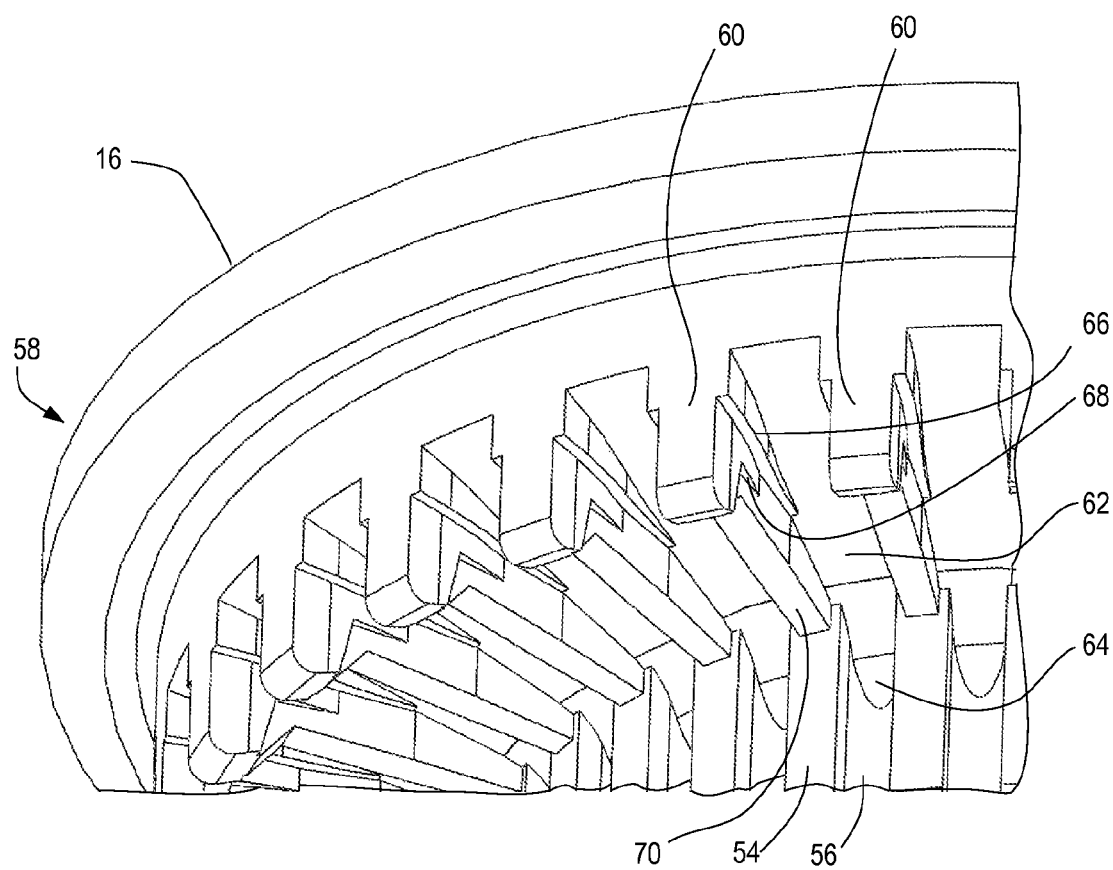
FIG. 9 is a detailed perspective view of some of the ribs on the underside of the deflector of the variable arc irrigation nozzle of FIG. 1.

Extending about the outer circumference of a portion of the neck 50 of the deflector 16 are a plurality of radially-projecting and axially-extending ribs 54 which are spaced by axially-extending flow notches 56. The flow notches 56 have an upstream entrance disposed radially outward from the downwardly-facing helical wall 55, as illustrated in FIG. 8. A downstream exit of the flow notches 56 is aligned with the channels between adjacent ribs 60, as illustrated in FIG. 9. An inclined ramp 64 at the intersection of each of the channels and the flow notches 56 can assist in gradually turning the flow from being generally axially to projecting generally radially outwardly. The flow notches 56 can improve the ability of the spray nozzle 10 to provide for a matched precipitation rate, particularly desirable given the adjustable nature of the arcuate extent of the spray pattern from the spray nozzle 10. In other words, the flow notches 56 contribute to having proportional volumes of water discharged for given arcuate spray pattern settings.

As described above, and with reference to FIG. 4, the radially-inward edge surface of ledge 32 of the collar 14 is brought into or out of sliding and sealing engagement with the helical wall 52 of the deflector 16 in order to increase or decrease the arcuate extent of a water discharge opening and thus flow through the flow notches 56 disclosed about the neck 50 of the deflector 16. As can be appreciated from the foregoing description and the figures of the first exemplary embodiment, the arcuate extent of the water discharge opening is bounded at one end by a fixed edge formed by a step 53, shown in FIG. 8, in the helical portion of the downward-facing helical surface 55 of the deflector 16. The other, moveable end of the arcuate extent of the water discharge opening is bounded by the axially-extending wall 34 between axially-offset ends of the helical ledge 32, as shown in FIG. 7.

It can be preferable to ensure that the moveable end of the arcuate extend of the water discharge opening is aligned with one of the ribs 54 positioned between adjacent flow notches 56. In other words, it can be preferable to ensure that the last flow notch 56 through which fluid flows at the moveable edge of the spray pattern is completely open—as opposed to partially blocked. A partially blocked flow notch 56 can result in a spray pattern with an errant edge portion as compared to the remainder of the spray pattern. In order to ensure that the last flow notch 56 is not partially blocked positive indexing is provided for the adjustment of the collar 14 in positions whereby the radially-inward edge surface of ledge coinciding with the axially-extending wall 34 has a plurality of preset positions where it is aligned or substantially aligned with a rib 54 as opposed to a notch 56. While possible for substantial misalignment between positions, there is a bias for the collar 14 to be in one of the plurality of preset conditions aligned with a rib 54 as opposed to a notch 56. The bias can be such that it requires a greater force to rotate the collar 14 out of alignment, i.e., away from being in a preset position, than between alignments, i.e., between preset positions.

Turning to an alternative exemplary embodiment, illustrated in FIGS. 15-19, an adjustable arc irrigation nozzle 100 is provided with positive indexing for adjusting the arcuate extent of the spay pattern. Similar to the exemplary embodiment of FIGS. 1-14, and with like reference numbers representing similar or like components, the alternative exemplary embodiment of an adjustable arc irrigation nozzle 100 includes a base 112 fixed relative to a deflector 16 with an axially interposed collar 114 movable, e.g., rotatable, to adjust the arcuate extent of a discharge opening. Although the exemplary embodiments herein utilize rotation to adjust the discharge opening, other types of relative movement could also be used, such as axial movement alone or in combination with rotational movement. A screw 18 is provided for adjust the radius of throw of the spray pattern emanating from the nozzle 100. These components are the same as described in the previous embodiment, with the following exceptions relating to the incorporation of the positive indexing of the collar 114 relative to the base 112 and deflector 16. While the collar 114 is described herein and depicted in several embodiments, the term collar can refer to any member moveable for adjustment, whether externally accessible or internally accessible.

Figure 16:
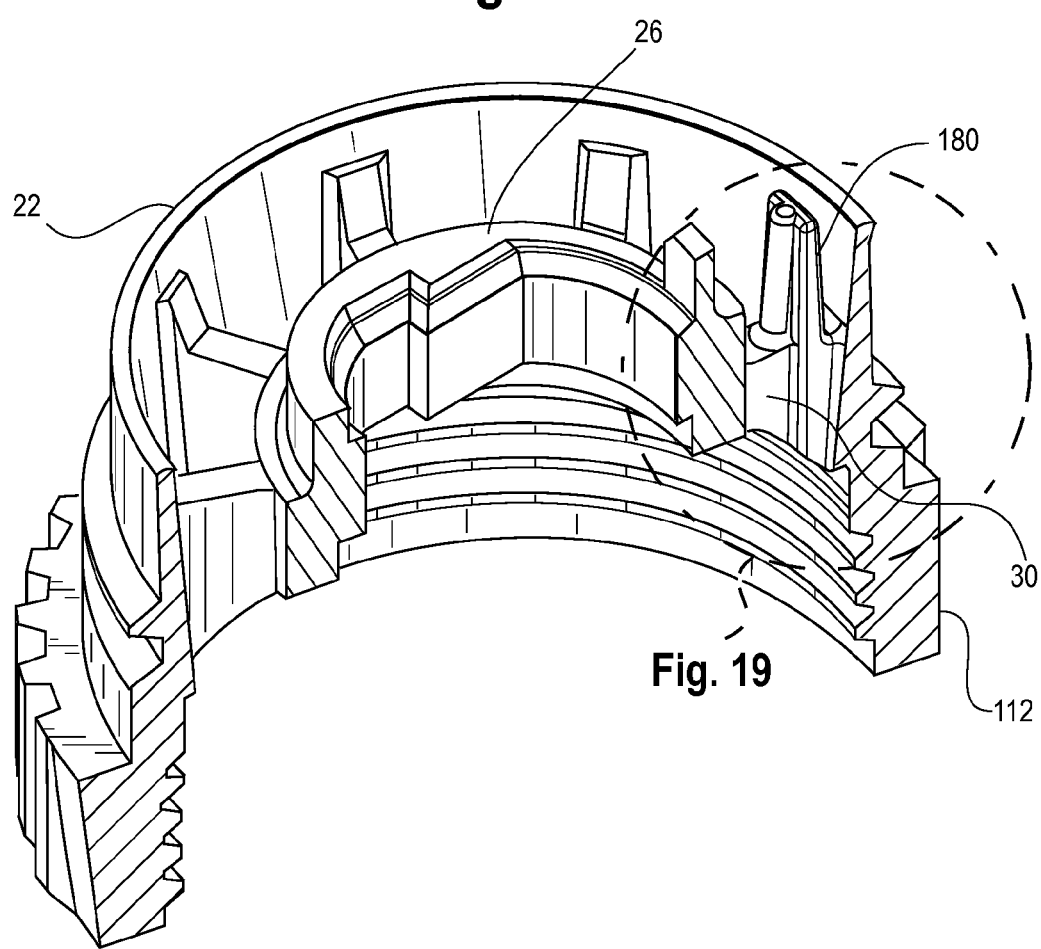
FIG. 16 is a cut-away perspective view of the top of the base of the nozzle of FIG. 15, showing an upstanding cantilever spring.

In order to achieve the positive indexing, the base 112 includes a spring 180 cantilevered upwardly from one of the connecting webs 30 supporting the interior center disc 26 in spaced relation from the upper skirt 22, as depicted in FIG. 16. The spring 180 is positioned to be biased into detents 192 formed about an inner surface of the collar 114, where the detents 192 are spaced by relatively raised segments 190 (which may be flush with the remainder of the immediately adjacent surface). Each of the detents 192 corresponds to a preset rotational position of the collar 114 relative to the base 112 and the deflector 16 and, hence, a corresponding preset size of the adjustable arcuate discharge opening. The spring 180 is preferably biased into an aligned detent 192, which biasing force can be overcome to move the spring 180 out of engagement with the detent 192 so that the spring 180 can slide along the intermediate raised segments 190 to the next detent 192 when the collar 114 is rotated relative to the base 112 and the deflector 16. The spring 180 can snap at least partially into an aligned detent 192 such that there is an audible and/or tactile response to a user.

Figure 17:
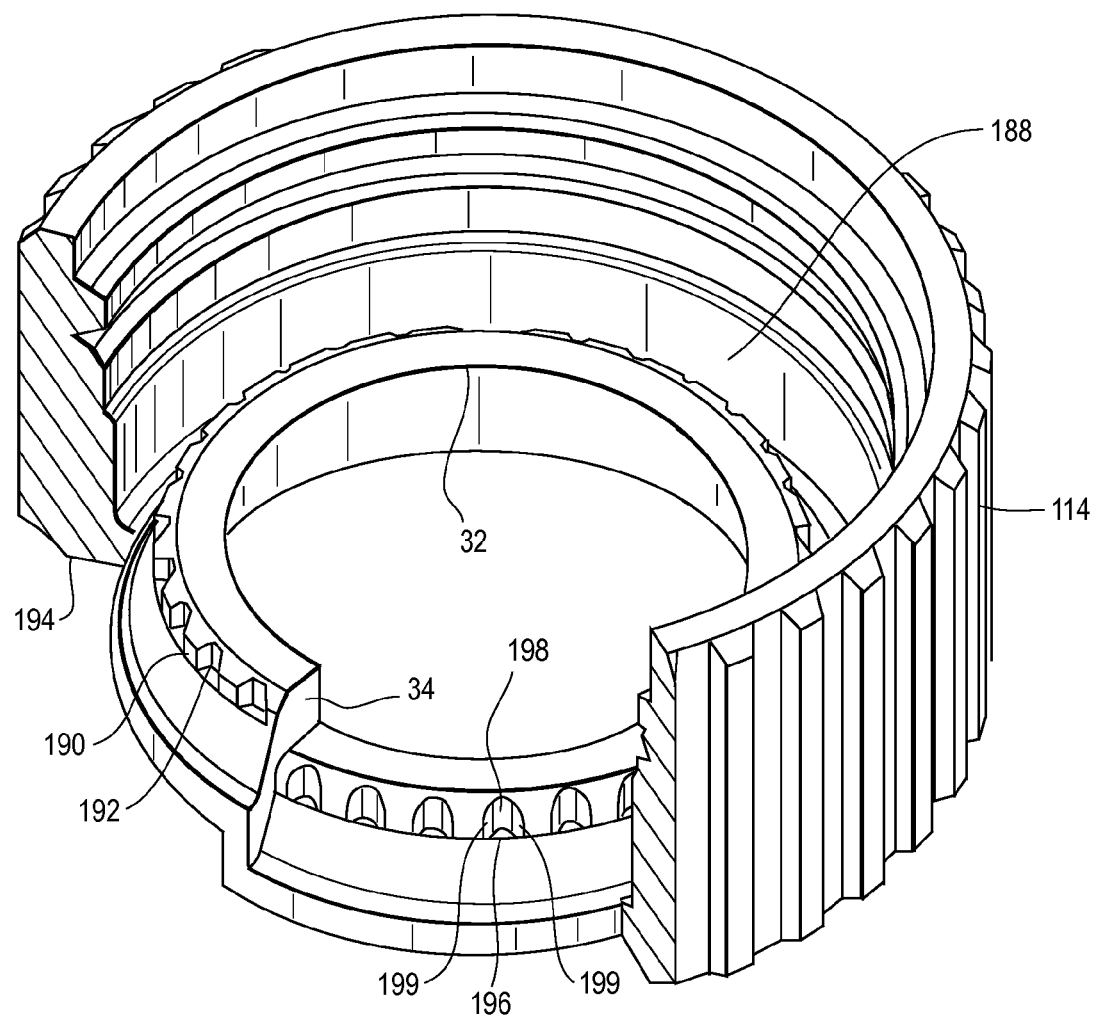
FIG. 17 is a cut-away perspective view of the bottom of the collar of the nozzle of FIG. 15, showing notches positioned to cooperate with the cantilever spring for indexing the rotation of the collar relative to the deflector and base.
Figure 19:
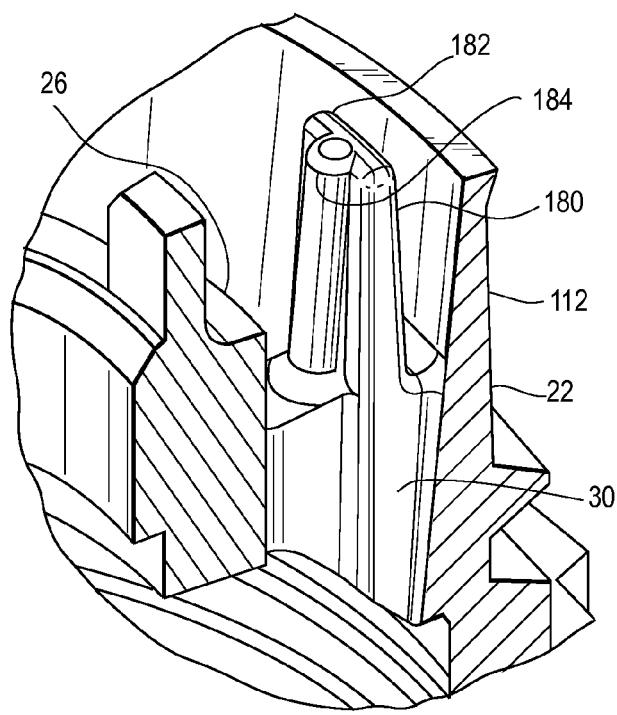
FIG. 19 is a detailed view of region XIX of FIG. 15, showing the cantilever spring of the base.

The spring 180 is integrally formed with the base 112 and includes a generally circumferentially aligned, axially extending tapered, upstanding portion 182. Facing radially inward from the upstanding portion 182 and also axially extending is a projecting rib 184 being generally semi-circular in shape and generally centered on the upstanding portion 182, as illustrated in FIG. 19. The detents 192 and intermediate raised segments 190 are formed in a radially-outward facing surface of a downwardly-depending wall 190 extending between a top portion 194 of the collar 114 and the radially-inward extending helical ledge 32, as illustrated in FIG. 17. Each of the detents 192 includes an arcuate back wall 198, a top wall 196 and a pair of inclined or curved entrance and exit sidewalls 199. The bottom and front of the detent 192 are open for receiving a portion of the spring 180 when aligned therewith. When the nozzle 100 is assembled, the spring 180 is received within a recess 186 formed between a radially-inward facing surface of an outer wall 188 of the collar 114 and the downwardly-depending wall 190.

Figure 15:
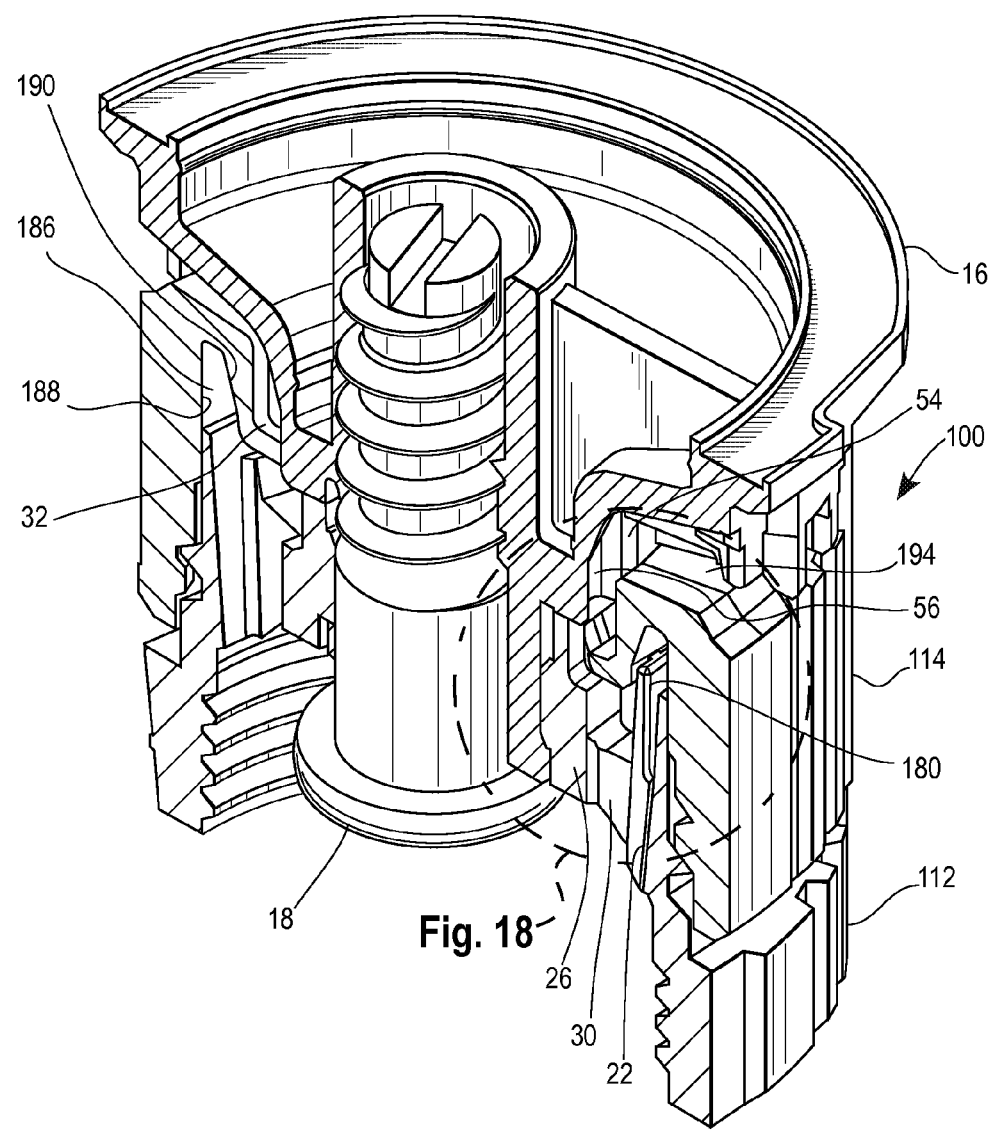
FIG. 15 is a partial section view of an alternative exemplary embodiment of a variable arc irrigation nozzle similar to that of FIG. 1, but configured for indexing the arcuate position of the collar relative to the deflector and base.
Figure 18:
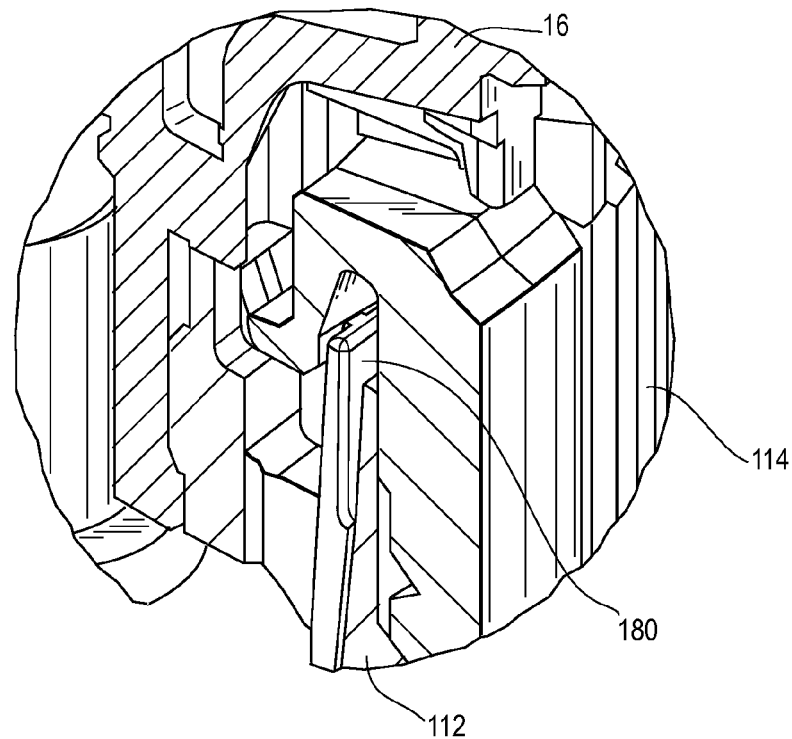
FIG. 18 is a detailed view of region XVIII of FIG. 16, showing the cantilever spring.

More specifically, the projecting rib 184 of the spring 180 is dimensioned to be substantially received within the detent 192, as illustrated in FIGS. 15 and 18. The number and position of detents 192 corresponds to the number of ribs 54 between flow notches 56, such that the radially-inward edge surface of ledge 32 coinciding with the axially-extending wall 34 is aligned with a rib 54 as opposed to a flow notch 56 of the deflector 116. The detents 192 do not need to be directly aligned with the ribs 54, provided that the relative positions between the spring 180 and detents 192 result in unblocked or substantially unblocked last flow notch 56.

Figure 20:
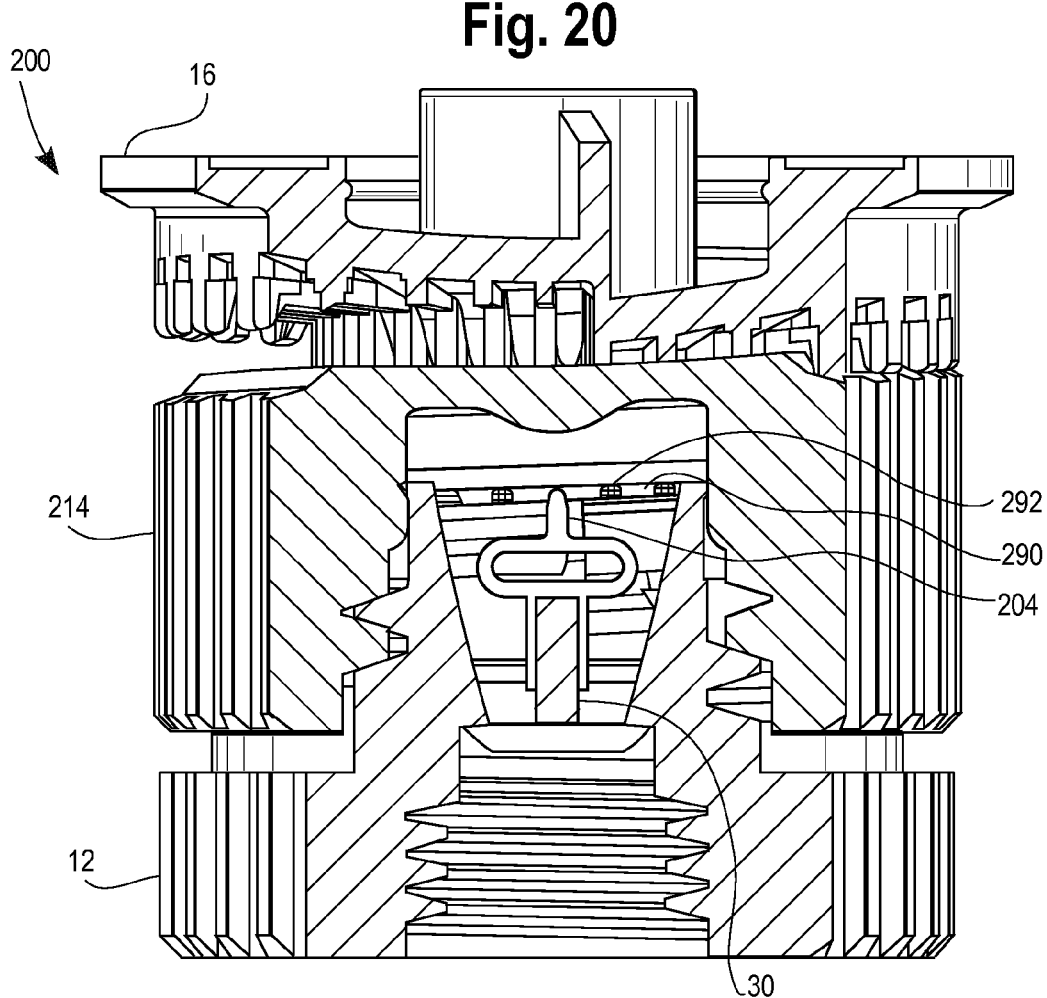
FIG. 20 is a partial section view of another alternative exemplary embodiment of a variable arc irrigation nozzle similar to that of FIG. 15, but having a different structure for indexing the arcuate position of the collar relative to the deflector and base, such structure including a detent spring.
Figure 21:
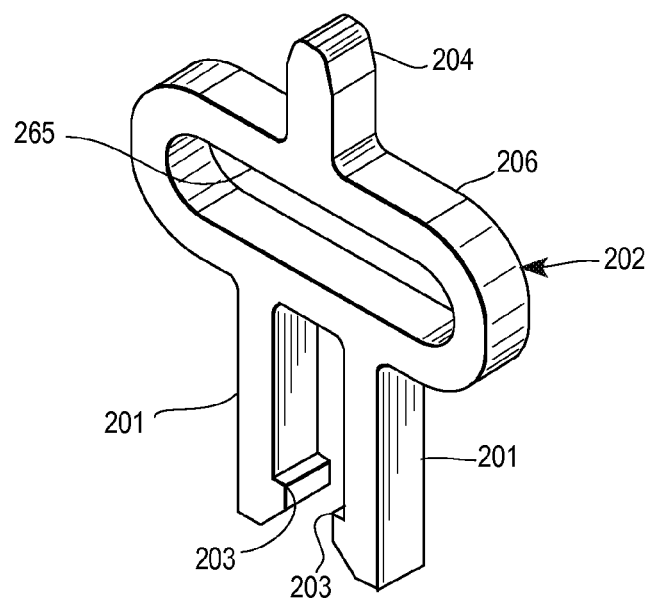
FIG. 21 is a perspective view of the detent spring of FIG. 20.

In another alternative exemplary embodiment, illustrated in FIGS. 20 and 21, an adjustable arc irrigation nozzle 200 is provided with positive indexing for adjusting the arcuate extent of the spay pattern. Similar to the exemplary embodiment of FIGS. 1-14, and with like reference numbers representing similar or like components, the alternative exemplary embodiment of an adjustable arc irrigation nozzle 200 includes a base 12 fixed relative to a deflector 16 with an axially interposed collar 214 rotatable to adjust the arcuate extent of the discharge opening. A screw is provided for adjust the radius of throw of the spray pattern emanating from the nozzle 200. These components are the same as described in the previous embodiment, with the following exceptions relating to the incorporation of the positive indexing of the collar 214 relative to the base 12 and deflector 16.

In this embodiment, a separate spring 202 is positioned to engage a series of detents 292 formed in the collar 214 to provide for positive indexing of the collar 214 relative to the base 12 and deflector 16. The detents 292 are spaced by raised portions 290 and are positioned in a similar location as described in the prior embodiment but opening downward, as illustrated in FIG. 20, as opposed to radially outward, as illustrated in FIG. 17.

The spring 202 includes a closed, oval shaped portion 206. A top wall 205 of the oval shaped portion 206 includes a projecting finger 204 which is configured to slide into and out of the detents 292 as the collar 214 is rotated. To facilitate such sliding, the leading and trailing edges of the finger 204 can be tapered, as illustrated in FIG. 21. Depending from the oval shaped portion 206 and on an opposite side thereof from the finger 204 is a pair of opposing legs 201. The legs 201 are spaced to permit the spring 202 to be attached to one of the connecting webs 30 supporting the interior center disc 26 in spaced relation from the upper skirt 22, as depicted in FIG. 20. In particular, the spacing between the legs 201 is selected to permit one of the webs 30 to be received therebetween. Tapered protuberances 203 at the ends of the legs 201 opposite the oval shaped portion 206 are configured to facilitate attachment and retainment of the spring 202 on the web 30. In use, the top wall 205 of the oval shaped portion 206 can deflect toward the legs 201 when the finger 204 is urged in that direction as it moves out of a detent 292 and along an intermediate raised portion 290, then provide a biasing force urging the finger 204 into engagement with a detent 292.

While the description herein and the exemplary embodiments of FIGS. 15-21 are of an adjustable arc nozzle having the above-described flow notches 56 spaced by ribs 54, the advantages of the positive indexing with preset positions are also applicable to other types of adjustable arc nozzles lacking such features. Those advantages include a tactile and/or audible indication that can be made when the collar 14 enters one of the preset positions as opposed to between preset positions to provide feedback to the user that the collar 14 is in one of the preset positions. Another advantage is the ability to provide preset positions corresponding to specific angles or increments of angles, e.g., a preset position every 3 degrees, 5 degrees, 10 degrees, 15 degrees, 30 degrees, 45 degrees or 90 degrees. Some of the preset positions may have a greater bias against removal as opposed to other preset positions. For example, a greater bias may exist for positions spaced 45 degrees apart as compared to other preset positions between each 45 degree position. This greater biasing could be achieved by having some of the detents deeper than other or by having the entrance and or exit side portions of the detents with different angles of inclination or radius of curvature. Further, the detents can be configured such that it is easier to overcome the spring bias in one direction as compared to an opposite direction. Yet another advantage of a bias against removal from a preset position is that the arcuate extent of the spray pattern can be less susceptible to unintentional change, such as do to bumping with landscape tools.

Furthermore, relying solely upon friction to maintain an arc setting is not longer necessary if the positive indexing is incorporated into a variable arc nozzle. This can advantageously mean that components can be designed for easier relative rotation to adjust the arcuate extent of a spray pattern with the biasing providing the ability to retain a desired setting. Moreover, the incorporation of positive indexing can reduce the impact of rotational torque degradation over time, such as due to plastic creep, as can occur in nozzles that rely solely upon friction to maintain an arc setting.

Although the springs 180 and 202 of the variable arc nozzles 100 and 200 have been described as being attached to or integral with the base 112 or 12 and the detents 192 and 292 being formed in the collar 114 or 214, they could be reversed.

In the exemplary embodiments of a variable arc spray nozzle 10, 100 and 200 depicted in the accompanying figures, the nozzles 10, 100 and 200 may be configured to have a 12' throw. There may be thirty flow notches 56 feeding thirty channels separated by ribs 60, with thirty ribs 60 total and one rib extending from the ends of the helically-inclined array of ribs 60, which one rib lacks micro-ramps in the illustrated embodiment. For the nozzles 100 and 200 with positive indexing, there would be thirty detents 192, with the last position corresponding to abutment of the one rib extending from the ends of the helically-inclined array of ribs 60 and the wall 34 between ends of the helical ledge 32 of the collar 14 or other similar structure on the collar 14. Each of the axially-extending ribs projects outwardly about 0.0255 inches, has a width at its outward end of about 0.024 inches and adjacent ones form a flow notch 56 with an inward taper of about 6.2 degrees with a bottom radius of about 0.0125 inches. The length may be about 0.92 inches. The inclined ramp 64 may be outwardly-inclined at about 20 degrees relative to a central axis. The ribs 60 are spaced at about 10 degrees to about 12 degrees apart. The first step is between about 0.004 and 0.008 inches in width from the sidewall of the adjacent portion of the rib 60, such as about 0.006 inches. A distal end of each of the ribs 60, including the first step 66, may be about 0.040 inches with about a 3 degree taper, with the portion on the opposite side of the step 66 from the bottom wall 62 being about 0.028 inches in width, with a proximate end of each of the ribs 60 being about 0.018 inches. The second step 68 may be between about 0.002 and 0.006 inches in width, such as about 0.004 inches in width. The angle of the linear portion 70a of the bottom wall 62 may be about 9 degrees toward a horizontal plane coinciding with the top of the deflector 16, with the inward segment 70b being inclined about 50 degrees away from the plane and the intermediate segment 70c being inclined about 20 degrees away from the plane. While these dimensions are representative of the exemplary embodiment, they are not to be limiting, as different objectives can require variations in these dimensions, the addition or subtraction of the steps and/or micro-ramps, and other changes to the geometry to tailor the resultant spray pattern to a given objective.

Figure 22:
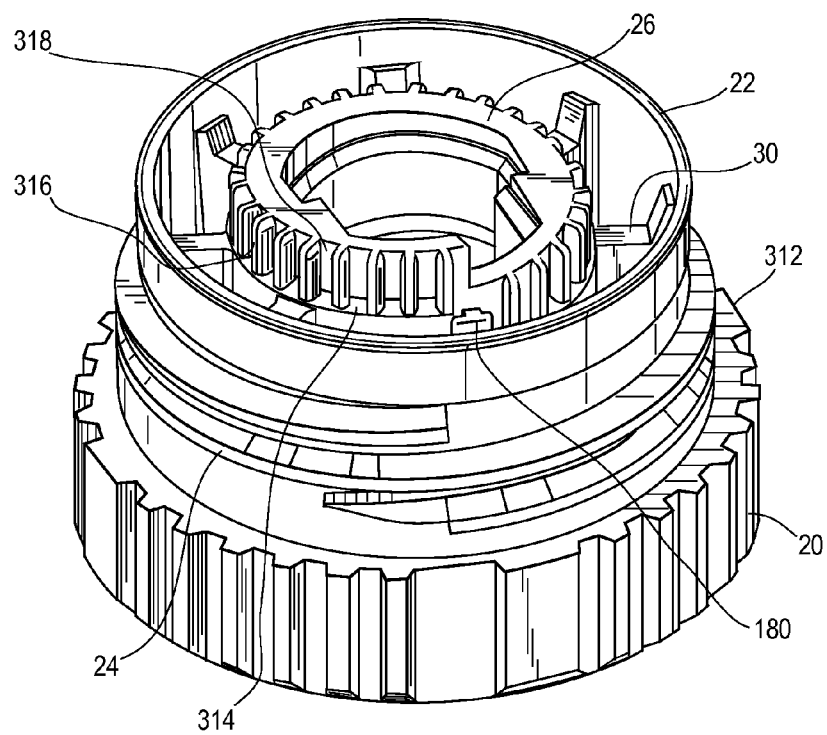
FIG. 22 is a perspective view of an exemplary embodiment of an alternative base having a plurality of radially extending ribs for reducing cross-sectional flow area through the nozzle.
Figure 23:
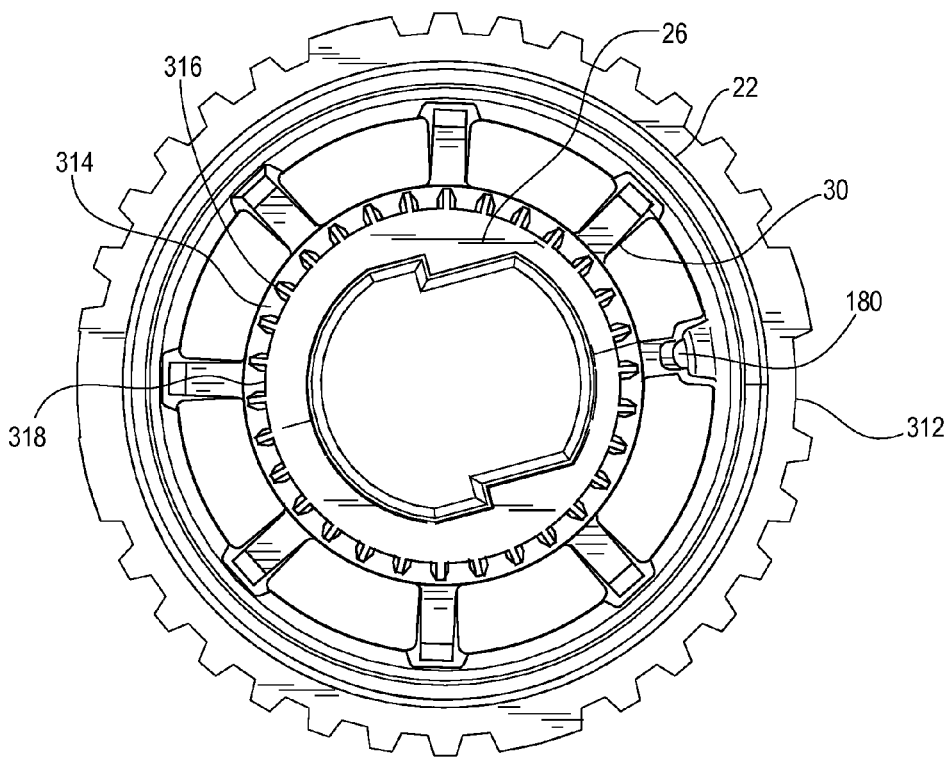
FIG. 23 is a top plan view of the base of FIG. 22.
Figure 24:
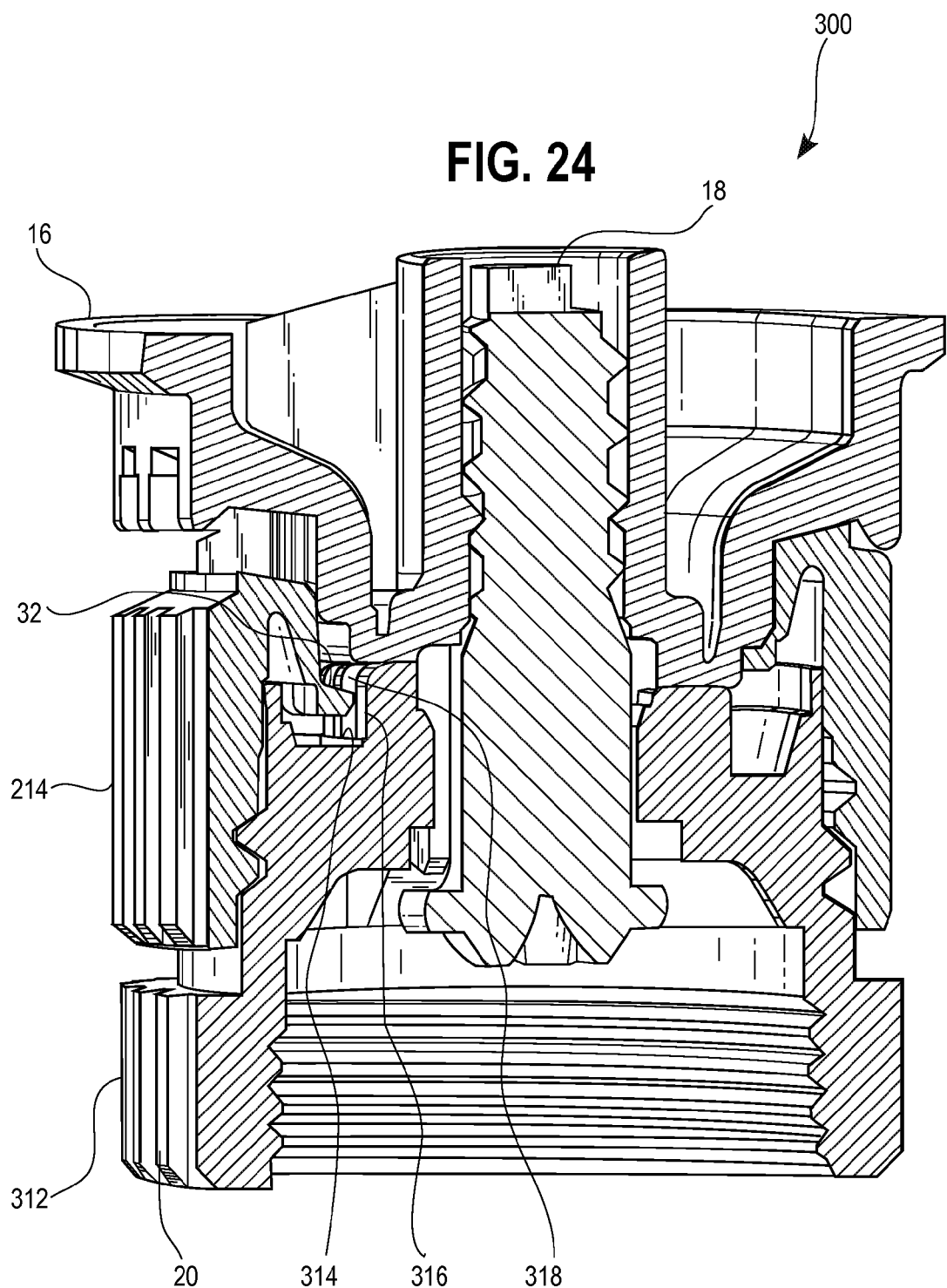
FIG. 24 is a sectional of another alternative exemplary embodiment of a variable arc irrigation nozzle similar to that of FIG. 1, but incorporating the base of FIG. 22.

An alternative base 312 can be used in place of the above-described bases 12 and 112, as is depicted in FIGS. 22-24. The alternative base 312 is configured to be used for reducing the flow through the nozzle 300 upstream of the deflector 16. More specifically, the cross-sectional flow area upstream of the deflector 16 can be reduced in order to reduce the volume of flow through the nozzle 300, and may be useful in reduced-radius applications. Radius reduction can alternatively or in addition be achieved by modifying the notches on the neck of the deflector 16, such as by decreasing the flow area of the notches.

Turning to FIGS. 22 and 23, the alternative base 312 is similar to the prior bases 12 and 112 in that it has a lower skirt 20 and an upper skirt 22 both surrounding a central opening. The lower skirt 20 includes internal threads 40 to allow the base 312 (and hence the assembled nozzle 300) to be threadingly connected to a riser, stand or the like of a sprinkler for receiving pressurized water. The upper skirt 22 includes external threading 24 configured to mate with internal threading of the collar 214, as shown in FIG. 24. The collar 214 can be rotated relative to the base 312 along the mating threads. The base 312 and collar 214 can optionally be configured for indexing, such as by using the spring 180 and detents or the other mechanisms described herein.

The interior center disc 26 of the alternative base 312 includes a plurality of radially-outward extending ribs 316 disposed about the upper circumference thereof, as illustrated in FIGS. 22 and 23. The ribs 316 define a plurality of flow passages 318 therebetween, and extend upward from a radially-extending ledge 314 of the disc 26. When assembled with the deflector 16 and the collar 14 or 214, as illustrated in FIG. 24, the radially-inward edge surface of the ledge 32 of the collar 214 is adjacent to or abuts the outer periphery of the ribs 316 to further bound the flow passages 318. The result is that water flowing through the nozzle 300 flows at least partially through the flow passages 318 between the ribs 316 before being discharged against the deflector 16. The function of the ribs 316 is to reduce the cross-sectional flow area between the ledge 32 of the collar 14 or 214 and the adjacent portion of the base 312, particularly compared to if the base 312 lacked the ribs 316. In one particular example of a nozzle 300 configured for a 12' throw, the ribs 316 can be dimensioned to provide a reduction in flow rate of about 25%. For instance, the flow area without ribs can be about 0.034 inches-squared and with ribs can be about 0.26 inches-squared. The use of the ribs 316 can be advantageous when the distance between the radially-inward edge of the ledge 32 and the adjacent portion of the disc 26 of the base has already been minimized, such as based upon tolerances for manufacturing and the environment in which the nozzle operates. The flow passages 318 can optionally be the same in number and aligned with the notches and channels of the deflector 16.

Although the ribs 316 illustrated herein are uniform in size and spacing about the base 312, it is contemplated that they could vary in size, such as width, and spacing depending upon specific design needs that may arise. For example, the ribs could take the form of an undulating surface about the disc. Also, other obstructions in the flow path instead of ribs can be used to reduce the cross-sectional flow area upstream of the deflector surface. Furthermore, which the use of the ribs 316 for reducing cross-sectional flow area of the nozzle 300 is described and depicted with respect to a variable arc nozzle with a deflector having microramps and configured for indexing, the ribs 316 can be incorporated into a nozzle that is not configured for an adjustable arc, and/or not configured with microamps, and/or not configured for indexing.

It will be understood that various changes in the details, materials, and arrangements of parts and components, which have been herein described and illustrated in order to explain the nature of the invention may be made by those skilled in the art within the principle and scope of the invention as expressed in the appended claims.

The invention claimed is:

1. An irrigation spray nozzle configured for reduced flow, the nozzle comprising:
    an inner portion having a plurality of ribs projecting radially outward from and joined along the entirety of their axial length to an outer circumference of the inner portion;
    an outer portion surrounding the inner portion and the plurality of ribs thereof and cooperating with the inner portion to define a plurality of flow passages between adjacent ones of the plurality of ribs of the inner portion and surfaces of the outer circumference of the inner portion disposed between the adjacent ones of the plurality of ribs, the plurality of ribs being effective to reduce a cross-sectional flow area between the inner and outer portions to reduce the flow through the nozzle; and
    a deflector downstream of the plurality of ribs of the inner portion for receiving water from the plurality of flow passages and deflecting the water outwardly, wherein the deflector has a neck with a plurality of flow notches disposed about its outer periphery, the plurality of flow notches being downstream of the plurality of flow passages disposed between adjacent ones of the plurality of ribs of the inner portion.

2. The irrigation spray nozzle of claim 1, wherein the plurality of ribs of the inner portion are equally spaced about the inner portion.

3. The irrigation spray nozzle of claim 1, wherein the plurality of ribs of the inner portion each have the same width.

4. The irrigation spray nozzle of claim 1, wherein the deflector has an underside with a plurality of depending ribs thereon defining channels therebetween, at least some of the depending ribs of the deflector have a step that extends at least partially along a length of the plurality of depending ribs of the deflector and into the channels for directing a portion of the water flow.

5. The irrigation spray nozzle of claim 1, wherein an underside of the deflector includes means for discharging more than one discrete spray.

6. The irrigation spray nozzle of claim 1, wherein the nozzle is configured to provide an adjustable arcuate surface, further comprising:
    a base having the inner portion;
    a first helical surface fixed relative to the base; and
    a second helical surface moveable relative to the base, the first and second helical surfaces cooperating to define an arcuate flow passage adjustable in size to determine an arc of spray distribution upon relative rotation between the first and second helical surfaces.

7. The irrigation spray nozzle of claim 6, wherein the second helical surface is fixed relative to the outer portion.

8. The irrigation spray nozzle of claim 6, wherein the outer portion is part of a nozzle body mounted for rotation relative to the base and includes the second helical surface; the neck of the deflector includes the first helical surface.

9. The irrigation spray nozzle of claim 8, wherein an underside of the deflector has a plurality of depending ribs thereon defining channels therebetween, at least some of the plurality of depending ribs of the deflector have an outwardly-extending step at least partially along a length of the at least some of the plurality of depending ribs of the deflector and into the channels for directing a portion of the water flow.

10. The irrigation spray nozzle of claim 9, wherein the plurality of flow notches of the neck of the deflector are aligned with the channels formed between the plurality depending ribs of the deflector such that water flow paths extend through the plurality of flow notches and into the plurality of channels.

11. The irrigation spray nozzle of claim 8, wherein an underside of the deflector includes means for discharging more than one discrete spray.

12. The irrigation spray nozzle of claim 1, wherein the flow notches of the neck of the deflector are disposed radially outwardly from the plurality of flow passages between adjacent ones of the plurality of ribs of the inner portion, and wherein the deflector has an underside with a plurality of depending ribs thereon defining channels therebetween downstream of the flow notches.

13. The irrigation spray nozzle of claim 1, wherein the plurality of flow passages between adjacent ones of the plurality of ribs of the inner portion are aligned with the plurality of flow notches of the neck of the deflector.

14. An irrigation spray nozzle configured for reduced flow, the nozzle comprising:
- a base having an upper skirt and a lower skirt, the upper skirt having external threading, the base having an interior center disc disposed radially inward and spaced from the upper skirt to form a fluid passage between the upper skirt and the center disc, the center disc having a plurality of radially-outward extending ribs projecting from an upper circumference thereof, the plurality of radially-outward extending ribs of the base defining a plurality of flow passages therebetween;
- a collar disposed about the upper skirt of the base and having internal threading configured to mate with the external threading of the base such that the collar can be rotated relative to the base along the mating threads, the collar having an interior ledge with a radially-inward edge that is adjacent to or abuts a radially outward periphery of the plurality of radially-outward extending ribs of the base to further bound the plurality of flow passages therebetween, the plurality of radially-outward extending ribs of the base reducing a cross-sectional flow area between the ledge of the collar and an adjacent portion of the base as compared to if the base lacked the plurality of radially-outward extending ribs, the collar including a helical surface; and
- a deflector for receiving water from the plurality of flow passages and deflecting the water outwardly, wherein the deflector has a neck with a plurality of flow notches disposed about its outer periphery, the plurality of flow notches being downstream of the plurality of radially-outward extending ribs of the base, and wherein the deflector includes a helical surface cooperating with the helical surface of the collar to define a flow passage between those helical surfaces that is adjustable in size to determine an arc of spray distribution upon relative rotation between the collar and the deflector.

15. The irrigation spray nozzle of claim 14, wherein the plurality of radially-outward extending ribs of the base extend upward from a radially-extending ledge of the center disc with free edges of the ribs facing toward the deflector.

16. The irrigation spray nozzle of claim 14, further comprising means for positive indexing of the relative rotation between the base and collar.

17. The irrigation spray nozzle of claim 16, wherein an underside of the deflector includes means for discharging more than one discrete spray.

18. The irrigation spray nozzle of claim 14, wherein an underside of the deflector includes means for discharging more than one discrete spray.

19. The irrigation spray nozzle of claim 14, wherein the flow notches of the neck of the deflector are disposed radially outwardly from the plurality of flow passages between adjacent ones of the plurality of radially-outward extending ribs of the base, and wherein the deflector has an underside with a plurality of depending ribs thereon defining channels therebetween downstream of the plurality of flow notches.

20. The irrigation spray nozzle of claim 14, wherein the plurality of flow passages between adjacent ones of the plurality of radially-outward extending ribs of the base are aligned with the plurality of flow notches of the neck of the deflector.

21. The irrigation spray nozzle of claim 14, wherein the radially-inward edge of the interior ledge of the collar has a height that is less than a height of the plurality of radially-outward extending ribs of the base.

22. The irrigation spray nozzle of claim 14, wherein the flow passages have an entrance axially upstream of the interior ledge and an exit axially downstream of the interior ledge such that flow can enter the flow passages in a generally radially inward direction.

* * * * *